(12) United States Patent
Suzuki

(10) Patent No.: US 7,468,818 B2
(45) Date of Patent: Dec. 23, 2008

(54) APPARATUS AND METHOD OF READING IMAGES ON DUPLEX DOCUMENT WITH VARIABLE START-OF-READING TIMING

(75) Inventor: Nobuhiko Suzuki, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 63 days.

(21) Appl. No.: 11/592,166

(22) Filed: Nov. 3, 2006

(65) Prior Publication Data

US 2007/0103741 A1 May 10, 2007

(30) Foreign Application Priority Data

Nov. 4, 2005 (JP) ............... 2005-321050

(51) Int. Cl.
*H04N 1/04* (2006.01)
*B41J 2/06* (2006.01)

(52) U.S. Cl. ..................... 358/498; 347/55

(58) Field of Classification Search ........... 358/498, 358/450, 474, 486, 496, 400; 347/234, 55, 347/115; 399/6, 87, 130; 271/3.01

See application file for complete search history.

(56) References Cited

U.S. PATENT DOCUMENTS

| | | | |
|---|---|---|---|
| 5,201,517 A * | 4/1993 | Stemmle | 271/291 |
| 5,689,793 A | 11/1997 | Kobayashi et al. | |
| 5,819,152 A | 10/1998 | Kobayashi et al. | |
| 5,826,155 A | 10/1998 | Kobayashi et al. | |
| 5,903,811 A | 5/1999 | Kobayashi et al. | |
| 2001/0035973 A1 * | 11/2001 | Kusumoto | 358/1.14 |
| 2005/0269759 A1 * | 12/2005 | Sano et al. | 271/3.01 |
| 2007/0018376 A1 * | 1/2007 | Sano et al. | 271/10.01 |

FOREIGN PATENT DOCUMENTS

| | | |
|---|---|---|
| JP | 8-133551 A | 5/1996 |
| JP | 2000-261619 A | 9/2000 |
| JP | 2002-125102 A | 4/2002 |
| JP | 2003-101691 A | 4/2003 |
| JP | 2003-234878 A | 8/2003 |
| JP | 2004-193955 A | 7/2004 |

* cited by examiner

*Primary Examiner*—Saeid Ebrahimi Dehkordy
(74) *Attorney, Agent, or Firm*—McDermott Will & Emery LLP

(57) ABSTRACT

A technique of processing images previously-formed on first and second opposite sides of a document is disclosed. The technique includes: reading the images on the document at a reading position by scan; transporting the document such that the first side is moved facing the reading position, and, after the first side is read, the second side is moved facing the reading position; and controlling at least one of a start-of-reading timing of the first side and a start-of-reading timing of the second side, such that a relationship between the start-of-reading timing of the first side and the start-of-reading timing of the second side varies, depending on whether or not an extension direction of a binding edge along which the document is to be bound is parallel to a document orientation in which a length of the document is oriented with respect to a transport direction of the document being transported.

18 Claims, 25 Drawing Sheets

APPARATUS AND METHOD OF READING IMAGES ON DUPLEX DOCUMENT WITH VARIABLE START-OF-READING TIMING

CROSS-REFERENCE TO RELATED APPLICATIONS

This application is based on Japanese Patent Application No. 2005-321050 filed Nov. 4, 2005, the content of which is incorporated hereinto by reference.

BACKGROUND OF THE INVENTION

1. Field of the Invention

Illustrative aspects of the present invention relates to techniques of reading images on a duplex document by scanning the document, and more particularly to techniques of varying at least one of start-of-reading timings with which an image reader starts reading opposite sides of a duplex document, respectively.

2. Description of the Related Art

In the industries of image forming apparatuses which are typically copiers or the like, there are known image reading apparatuses which incorporate an Auto Document Feeder (ADF) for feeding a document from a supply tray (i.e., an input tray) to an exit tray (i.e., an output tray) via a transport path (i.e., a feed path).

As one of various types of the above image reading apparatuses, there is known an image reading apparatus for reading a document for duplex purposes by scanning the document. This type of image reading apparatus is adapted to read the images previously formed on opposite sides (i.e., a first side and a second side) of a document during one cycle of document scanning operation.

In the automatic document feeder of JP-A-8-133551 discloses a type of image reading apparatus in which a document to be read is transported in a so-called switch-back manner that the original trailing end of the document is changed to the new leading end of the document for enabling duplex reading of the document.

FIGS. 19 and 20 illustrate a transport path employed in an image reading apparatus of the prior art, which can combine an ADF having a duplex reading function.

As illustrated in FIG. 19, a document G placed on a supply tray 100 with its first side facing upwardly is fed to a transport path 102 by a supply roller 101. The document G is transported along the transport path 102 so as to reach and pass through feed rollers 103 provided as desired.

As the document G moves across a scanning position X, the first side of the document G is read by an image reader 107 such as a CCD or a CIS. When the document G having its first side read is detected at its trailing end by a suitable sensor (not shown), exit rollers 104 are stopped while nipping the trailing end the document G.

As illustrated in FIG. 20, the exit rollers 104 reverse the transfer direction of the nipped document to a bi-directional path 105. The document G is then transferred again from the bi-directional path 105 to the transport path 102 to the upstream side of the scanning position X of the transport path 102. Consequently, the original leading end and the trailing end of the document G are reversed.

Then, the document G, which is fed forward by the feed rollers 103, moves across the scanning position X, while the image reader 107 reads a second side (opposite to the first side) of the document G.

When the document G having its second side read is detected at its trailing end by a suitable sensor (now shown), the exit rollers 104 are stopped while nipping the trailing end of the document G, and subsequently, the exit rollers 104 reverse the transfer direction of the nipped document to the bi-directional path 105.

The document G which has entered the transport path 102 from the bi-directional path 105 is Drought into a state in which the original trailing end of the document has been reversed to the new leading end of the document G, which is to say, a state in which the first side of the document G faces the scanning position X.

Then, the document G is fed forward along the transport path 102 to the exit tray 106 with the first side facing downwardly.

As a result of the above operation, the document G is read for a duplex mode to read both the first and second sides of the document G. Further, when the document G was one of documents stacked in the supply tray 100 in an original sequence, the document G is delivered to the exit tray 106 and placed on other documents previously placed on the exit tray 106 in the same sequence as the original one.

When an image recording apparatus incorporating the above-described image reading apparatus is used for duplex reading of an A4-sized document 110 having opposite sides on which respective images have been printed as illustrated in FIGS. 21(a) and 21(b), limitations can result as described below.

FIG. 21(a) illustrates a first side of the document 110 on which an image of "ABC" has been drawn along one of opposite short edges of the document 110, while FIG. 21(b) illustrates a second side (opposite to the first side) of the document 110 on which an image of "abc" has been drawn along one of the opposite short edges of the document 110.

The document 110 is categorized as a document bound along one of opposite long edges of the document for creation of files, books, booklets, flipbooks, calendars, for example.

That is to say, for the thus-categorized document 110, the image of "ABC" has been drawn on the first side of the document 110, on the basis of the fact that a long edge 111 is one of opposite long edges of the document 110 along which the document 110 will be bound, which is to say, using as a reference for image disposition, the long edge 111 along which the document 110 is to be bound for filing.

On the other hand, the image of "abc" has been drawn on the second side of the document 110, on the basis of the fact that a long edge 112 is one of opposite long edges of the document 110 along which the document 110 will not be bound, which is to say, using as a reference for image disposition, the long edge 112 along which the document 110 is not to be bound.

FIGS. 22(a) and 22(b) illustrate how the document 110 is transported in portrait or vertical orientation, and FIGS. 23(a) and 23(b) illustrate image data representative of the images on the document 110 which have been read by the image reader 107.

In FIGS. 21 and 23, the white arrows indicate the directions in which the opposite sides of the document 110 are read by the image reader 107 along the opposite sides.

For clarification of a document orientation in which a length of the document 110 is oriented with respect to a transport direction of the document 110, a top edge of the document 110 when viewed in a direction to allow an image formed on each side of the document 110 to erect is colored black to form a black-colored band.

Hereinafter, the top edge of a document will be referred to as "image-based top edge," while an opposite edge of the document, which is to say, a bottom edge of the document when viewed in a direction to allow the image formed on the document to erect will be referred to as "image-based bottom edge."

As illustrated in FIG. 22(a), when the document 110, which is to be bound along its one long edge, is transported with its first side facing upwardly, and with its image-based top edge (i.e., one of short edges of the document 110) leading in the transport direction of the document 110 (i.e., in portrait orientation), the image reader 107 starts reading the image on the first side of the document 110 at its image-based top edge.

FIG. 23(a) illustrates image data 113 produced by reading the first side of the document 110. After the image reader 107 finishes reading the first side of the document 110, the transport direction of the document 110 is reversed using a bi-directional path (not shown), to thereby change the original trailing end to the new leading edge of the document 110.

That is to say, the position of the image-based top edge and the position of the image-based bottom edge are switched to each other, with the result that the image-based bottom edge becomes the new leading edge.

Subsequently, the document 110 returns to an original transport path, and eventually, the image reader 107 starts reading the image on the second side of the document 110 at its image-based bottom edge. FIG. 23(b) illustrates image data 114 produced by reading the second side of the document 110.

There exists a case where the produced sets of image data 113 and 114 are enlargement printed using an image enlargement/reduction function provided in the image recording apparatus.

In this case, enlargement processing is performed for both the sets of the image data 113 and 114, using one of two extremes (i.e., opposite end points) of a start-of-reading edge of each of images represented by the sets of image data 113 and 114, or otherwise a center point 117 of the start-of-reading edge, as a reference point for enlargement.

In FIGS. 24(a) and 24(b), there are illustrated sets of enlargement image data 115 and 116 of the first and second sides of the document 110, the enlargement image data 115 and 116 being produced by the above-described enlargement processing at a desired magnification ratio (>100%) using the center point 117 of the above-described start-of-reading edge of the original image data 113 and 114 as the reference point for enlargement.

In FIGS. 24(a) and 24(b), there are illustrated the thus-produced enlargement image data 115 and 116 in solid lines, together with the size of the original document 110 (equal to the size of the original image data 113 and 114 illustrated in broken lines), for the convenience of comparison in size between the enlargement image data 115 and 116 and the A4-sized document 110.

Now, it is assumed that the size of the enlargement image data 115 and 116 is larger than the size of a recording sheet of paper or a print sheet (assuming that the recording sheet has the same size as the A4-sized document 110, in this instance).

In this instance, prior to the print of the enlargement image data 115 and 116 of the first and second sides of the document 110, the enlargement image data 115 and 116 are temporarily stored in an image memory.

For the first side of the document 110, the corresponding enlargement image data 115 has been produced as a result of the image reader 107 starting reading the first side of the document 110 at its image-based top edge. In this instance, the start-of-reading edge is equal to the image-based top edge.

Therefore, if the apparatus stores in the image memory only a portion of the enlargement image data 115 which ranges from a start edge of the enlargement image data 115 to a position distant from the start edge by a length equal to the longitudinal length of the recording sheet, and if the apparatus subsequently prints out the enlargement image data 115, then the enlargement print of the document 110 will be performed successfully, without any additional processing including such as processing of reversing the order of the image data.

On the other hand, for the second side of the document 110, the corresponding enlargement image data 116 has been produced as a result of the image reader 107 starting reading the second side at its image-based bottom edge. In this instance, the start-of-reading edge is equal to the image-based bottom edge.

Therefore, for and prior to successful print of the enlargement image data 116, the entire enlargement image data 116 is needed to be stored tentatively in the image memory, and to then perform additional processing including processing of trimming the enlargement image data 116 to a desired print region 118 (illustrated in FIG. 24(b) in dash-dot-dot lines), and processing of reversing the order of the trimmed image data for collating the image data of the first and second sides of the document 110.

For the above reasons, such an image recording apparatus that is configured to start reading a second side of a document at its image-based bottom edge can present a problem that an image memory requires an increased capacity adequate to store pre-processed enlargement image data.

Japanese Patent Application Publication No. 2002-125102 discloses an image forming apparatus allowing a start-of-reading position on a document to be read by an image reader, to be deviated from its original position as a function of a size ratio of a recording sheet to the document and an enlargement/reduction ratio for copying.

BRIEF SUMMARY OF THE INVENTION

When the document 110, which will be bound along its one long edge, as illustrated in FIG. 21, is fed in landscape or horizontal orientation as illustrated in FIGS. 25(a) and 25(b), the image reader 107 starts reading the first side of the documents 110 at its long edge 111, which is used as a reference for image disposition, while the image reader 107 starts reading the second side of the document 110 at its a long edge 112, which is used as a reference for image disposition.

In this instance, both the long edges 111 and 112 are in parallel to the transport direction of the document 110 (i.e., a reading direction of the document 110 to be read by the image reader 107).

That is to say, the geometrical relationship between the position of an image-formed region on the document 110 and the position of the start-of-reading edge of the document 110 when viewed in the transport direction of the document 110 is kept unchanged between the first and second sides of the document 110.

Therefore, when the document 110 is transported in landscape orientation, there is no need to vary image reading procedure between when reading the first side and when reading the second side of the document 110.

Nevertheless, if the technique of deviating the start-of-reading position as disclosed in the above-referenced publication is employed so as to inevitably deviate the start-of-reading position on the second side of the document 110, irrespective of whether the document 110 is transported in portrait orientation or in landscape orientation, then there can occur a failure to read a whole image desired to be read (e.g., unexpected skip of reading), possibly leading to a failure to successfully produce a desired printout.

Such a problem can occur when a document which will be bound along its short edge is transported in portrait orientation, provided that the start-of-reading position is inevitably deviated when reading a second side of the document.

Further, such a problem can occur even when a document is read for duplex purposes without reversing the transport direction of the document prior to the reading of a second side of the document.

It is therefore an object of the present invention to avoid unsuccessful reading of images on a document which can occur due to diversity in a combination of the extension direction of a binding edge along which the document is to be bound (i.e., whether its long edge or its short edge is used as a binding edge) and the orientation of the document with respect to its transport direction (i.e., whether the document is fed in portrait or vertical orientation or in landscape or horizontal orientation).

According to a first aspect of the present invention, an apparatus for processing images previously-formed on first and second opposite sides of a document is provided.

Aspects of the invention relate to apparatuses and methods for moving or conveying documents, e.g., in various document or sheet handling apparatuses, such as those included in image forming apparatuses. Feeder system according to at least some example of this invention may include (a) an image reader having a reading position and reading the images on the document at the reading position move relative to each other as the document and the reading position move relative to each other per each scan; (b) document transfer elements transporting the document such that the first side is moved facing the reading position, and, after the image reader reads the first side, transporting again the document such that the second side is moved facing the reading position; and (c) a timing controller controlling at least one of a start-of-reading timing of the first side during a preceding reading-stage by the image reader and a start-of-reading timing of the second side during a subsequent reading-stage by the image reader, such that a relationship between the start-of-reading timing of the first side and the start-of reading timing of the second side varies, depending on whether or not an extension direction of a binding edge along which the document is to be bound is parallel to a document orientation in which a length of the document is oriented with respect to a transport direction of the document being transported by the document transport elements.

Additional aspects of the invention relate to methods of feeding documents or other sheet materials, e.g., in various document or sheet handling apparatuses, such as image forming apparatuses.

Such method may include: (a) reading the images on the document at a reading position as the document and the reading position move relative to each other per each scan; (b) transporting the document such that the first side is moved facing the reading position, and, after the first side is read, transferring again the document such that the second side is moved facing the reading position; and (c) controlling at least one of a start-of-reading timing of the first side during a preceding reading-stage at the reading step and a start-of-reading timing of the second side during a subsequent reading-stage at the reading step, such that a relationship between the start-of-reading timing of the first side and the start-of-reading timing of the second side varies, depending on whether or not an extension direction of a binding edge along which the document is to be bound is parallel to a document orientation in which a length of the document is oriented with respect to a transport direction of the document being transported at the transporting step.

The present inventor has found that the relationship between the disposition of an image-formed region on a first side of a document and the disposition of an image-formed region on a second side of the same document depends on an extension direction of a binding edge along which the document is to be bound (i.e., whether its long edge is used as a binding edge or its short edge is used as a binding edge).

Additionally, the present inventor has found that the geometrical relationship between the position of an image-formed region on each side of a document and the position of a start-of-reading edge (i.e., a leading edge first entering the reading position, which corresponds to an earliest one of possible start-of-reading timings) of the document when viewed in the transport direction of the document is changed or kept unchanged between when reading the first side and when reading the second side of the document 110 at least depending on the following factors:

a document orientation in which a length of the document is oriented with respect to a transport direction of the document (i.e., whether the document is transported in portrait orientation or in landscape orientation); and an extension direction of a binding edge along which the document is to be bound (i.e., whether its long edge is used as a binding edge or its short edge is used as a binding edge).

Describing more specifically the above findings case by case:

A. Portrait Orientation Feed
1. Duplex-Reading with Transport-Direction Reverse
a. Long Edge Binding
   The geometrical relationship between the position of the image-formed region and the position of the start-of-reading edge (hereinafter, referred to as "the image-to-edge relationship") is varied between opposite sides of the document.
b. Short Edge Binding
   The image-to-edge relationship is not varied between the opposite sides of the document.
2. Duplex-Reading without Transport-Direction Reverse
a. Long Edge Binding
   The image-to-edge relationship is not varied between the opposite sides of the document.
b. Short Edge Binding
   The image-to-edge relationship is varied between the opposite sides of the document.
B. Landscape Orientation Feed
1. Duplex-Reading with Transport-Direction Reverse
a. Long Edge Binding
   The image-to-edge relationship is not varied between the opposite sides of the document.
b. Short Edge Binding
   The image-to-edge relationship is varied between the opposite sides of the document.
2. Duplex-Reading without Transport-Direction Reverse
a. Long Edge Binding
   The image-to-edge relationship is varied between the opposite sides of the document.
b. Short Edge Binding
   The image-to-edge relationship is not varied between the opposite sides of the document.

Still additionally, the present inventor has further found that the image-to-edge relationship affects the position and the size of a required read range on the document for successful reading of the document.

Based on the above findings, the above-described apparatus and method have been created.

BRIEF DESCRIPTION OF THE SEVERAL VIEWS OF THE DRAWINGS

The foregoing summary, as well as the following detailed description of illustrative embodiments of the invention, will be better understood when read in conjunction with the appended drawings. For the purpose of illustrating the invention, there are shown in the drawings illustrative embodiments which are presently preferred. It should be understood, however, that the invention is not limited to the precise arrangements and instrumentalities shown. In the drawings.

DETAILED DESCRIPTION OF THE INVENTION

Figure 1:
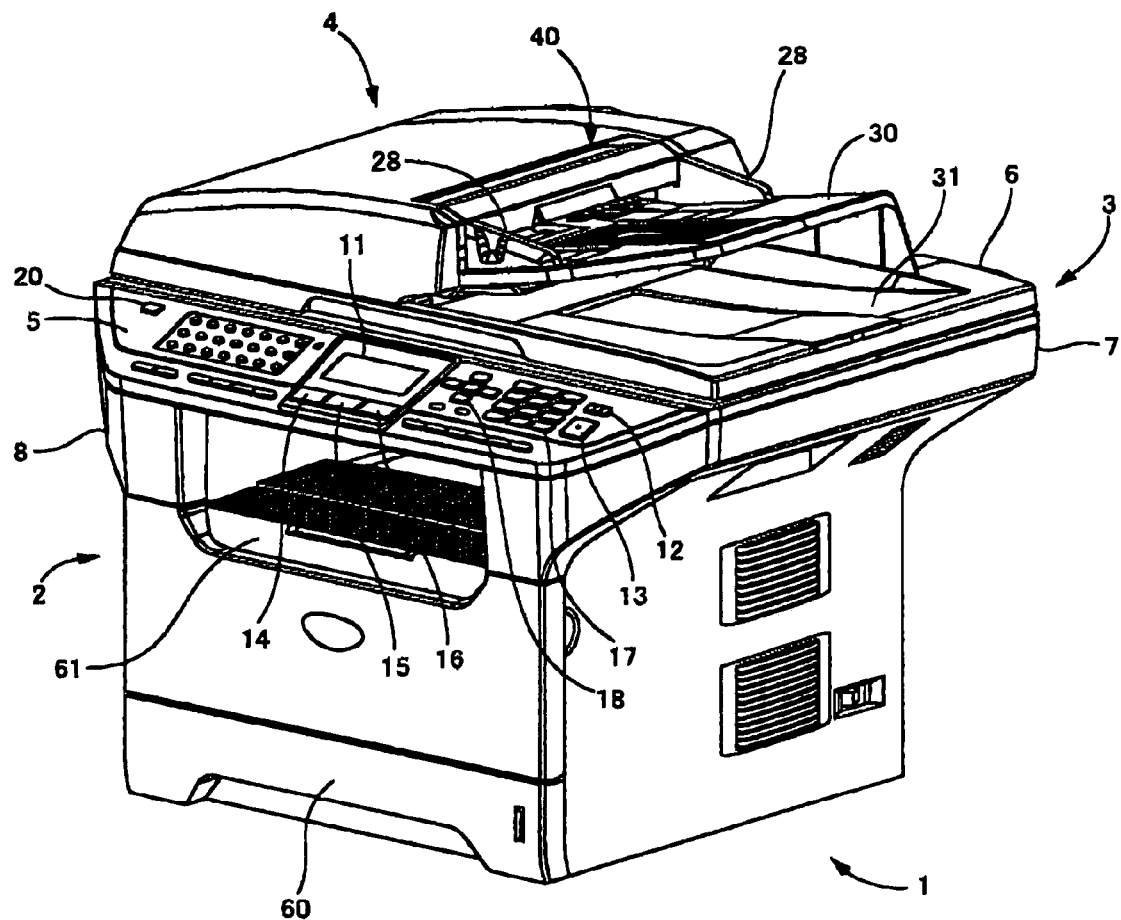
FIG. 1 is a perspective section showing a configuration of a multi-function device 1 according to a first illustrative embodiment of the present invention.

The illustrative modes of the invention will be stated below so as to be sectioned and numbered, and so as to depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the modes of the invention in such a dependent form as to depend from the other mode or modes does not exclude the possibility that the technological features set forth in a dependent-form mode become independent of those set forth in the corresponding depended mode or modes and to be removed therefrom. It should be interpreted that the technological features set forth in a dependent-form mode is allowed to become independent, where appropriate.

(1) An apparatus for processing images previously-formed on first and second opposite sides of a document, comprising:

an image reader having a reading position and reading the images on the document at the reading position as the document and the reading position move relative to each other per each scan;

a document transport unit transporting the document such that the first side is moved facing the reading position, and, after the image reader reads the first side, transporting again the document such that the second side is moved facing the reading position; and a timing controller controlling at least one of a start-of-reading timing of the first side during a preceding reading-stage by the image reader and a start-of-reading timing of the second side during a subsequent reading-stage by the image reader, such that a relationship between the start-of-reading timing of the first side and the start-of-reading timing of the second side varies, depending on whether or not an extension or elongation direction of a binding edge along which the document is to be bound is parallel to a document orientation in which a length of the document is oriented with respect to a transport direction of the document being transported by the document transport unit.

This apparatus allows the start-of-reading timings of a document to be automatically optimized based on the extension direction of the binding edge of the document (i.e., whether its long edge is used as the binding edge or its short edge is used as the binding edge) and the document orientation (i.e., whether the document is transported in portrait orientation or in landscape orientation), resulting in successful duplex reading without requiring excessive size of a read range on the document, and eventually without requiring excessive capacity of image data memory.

Throughout the description, the "start-of-reading timing" may be interpreted to mean, for example, a timing defined relative to an entry time of a document (e.g., an entry time of a leading end of the document) into the reading position of the image reader, with which the image reader starts reading the document per each of opposite face sides of the document.

The "document orientation" includes, typically, a portrait or vertical orientation and a landscape or horizontal orientation When the portrait orientation is selected for transporting a rectangular document having opposite long edges and opposite short edges, the document is transported with one of the short edges leading in the transport direction of the document (i.e., short edge first), and with the direction of the long edges being in parallel to the transport direction of the document.

Alternatively, when the landscape orientation is selected, the document is transported with one of the long edges leading in the transport direction of the document (i.e., long edge first), and with the direction of the short edges being in parallel to the transport direction of the document.

Typically, documents to be transported and read are categorized into two types. Each document is rectangular and has opposite long edges and opposite short edges.

The first type of a document is a document bound along one of the long edges for creation of a file. This is also a document having a binding edge extending in a lengthwise direction of the document.

On a first side of a document bound along the long edge, an image is disposed using one of the long edges along which the document is to be bound for creation of a file, as a reference for image disposition. On the other hand, on a second side of the same document, an image is deposited using one of the long edges along which the document is not to be bound for creation of a file, as a reference for image disposition.

In addition, the second type of a document is a document bound along one of the short edges for creation of a file. This is also a document having a binding edge extending in a widthwise direction of the document.

On a first side of a document bound along its short edge, an image is disposed using one of the short edges along which the document is to be bound for creation of a file, as a reference for image disposition. On the other hand, on a second side of the same document, an image is disposed using one of the short edges along which the document is not to be bound for creation of a file, as a reference for image disposition.

The "along a binding edge" set forth in the present mode means binding a document on its long or short edge, and binding a document on a binding margin disposed along the long or short edge, for example.

The "extension direction" of the binding edge is in parallel to one of the long edges (i.e., the lengthwise direction) of a document along which the document is to be bound, or otherwise one of the short edges (i.e., the widthwise direction) along which the document is to be bound.

The "timing controller" may be configured to control the operation of the image reader, in synchronization with movement of a document being transported by the document transport unit, and depending on the extension direction of the binding edge of the document and the document orientation of the document.

The "image reader" may be configured to achieve relative movement between a document to be read and the image reader by movement of the reading position (i.e., a movable reading position), which is to say, to be of a slit exposure type using a moving optical system.

Alternatively, the "image reader" may be configured to achieve the relative movement by movement of the document, with the reading position being stationary, which is to say, to be of a slit exposure type using a fixed optical system. The movement of the document may be achieved by use of the document transport unit or a document table moving mechanism.

(2) The apparatus according to mode (1), wherein the timing controller determines the extension direction of the binding edge, based on information entered by a user for specifying the extension direction of the binding edge.

This apparatus allows the extension direction of the binding edge to be easily and correctly identified using user-specified information.

(3) The apparatus according to mode (1) or (2), wherein the timing controller includes:

(a) a first determining section determining the extension direction of the binding edge, based on first input information;

(b) a second determining section determining whether or not the extension direction of the binding edge determined by the first determining section is parallel to the document orientation; and (c) a timing delay unit delaying one of the start-of-reading timing of the first side and the start-of-reading timing of the second side, with respect to the other, provided that the second determining section has determined that the extension direction of the binding edge is parallel to the document orientation.

In this apparatus, the extension direction of the binding edge is determined based on the first input information, and a determination is made as to whether or not the extension direction of the binding edge determined by the first determining section is parallel to the document orientation.

Further, in this apparatus, one of the start-of-reading timing of the first side and the start-of-reading timing of the second side is selectively delayed with respect to the other, provided that the second determining section has determined that the extension direction of the binding edge is parallel to the document orientation.

(4) The apparatus according to mode (3), wherein the document is defined by its opposite long edges and its opposite short edges perpendicular to the long edges, and wherein the first input information includes identification information used for identifying whether the document transported by the document transport unit is a document bound along one of the long edges, the document having a binding edge extending in a lengthwise direction of the document, or a document bound along one of the short edges, the document having a binding edge extending in a widthwise direction of the document, and wherein the first determining section determines whether the document transported by the document transport unit is a document bound along the long edge or a document bound along the short edge, based on the identification information.

In this apparatus, a determination is made as to whether a document to be read is a document bound along the long edge or a document bound along the short edge, based on the identification information (e.g., information which a user or operator has entered for identification of the type of the document of interest).

(5) The apparatus according to any one of modes (1)-(4), wherein the document transport unit reverses the transport direction of the document with respect to its original transport direction, prior to the subsequent reading-stage, and wherein the timing controller delays the start-of-reading timing of the second side with respect to the start-of-reading timing of the first side, provided that the extension direction of the binding edge is parallel to the document orientation.

In this apparatus, once a document to be read is fed forward from a tray, with a top edge of the document leading during transport of the document, the document is then transported such that a first face end of the document moves facing and across the reading position of the image reader.

Upon passing of the document through the reading position of the image reader, the image reader starts reading the first side of the document at its top edge.

Upon production of image data by reading the first side of the document, the original trailing end of the document is changed to the new leading end of the document. That is to say, the transport direction of the document is reversed.

As a result, the document is transported again such that a bottom edge of the document leading during transport of the document, and then a second face end of the document moves facing and across the reading position of the image reader.

Upon re-passing of the document through the reading position of the image reader, the image reader again starts reading the second side of the document at its bottom edge.

Further, in this apparatus, the start-of-reading timing of the second side is delayed with respect to the start-of-reading timing of the first side, provided that the extension direction of the binding edge is parallel to the document orientation.

As will be evident from the above, in this apparatus, when the extension direction of the binding edge is parallel to the document orientation, the start-of-reading timing of the second side is delayed with respect to the start-of-reading timing of the first side.

However, when the extension direction of the binding edge is not parallel to the document orientation, the start-of-reading timing of the second side is not delayed with respect to the start-of-reading timing of the first side. In this instance, both the first and second sides of the document are read from the common leading ends or the common trailing ends, whereby the image data is produced.

As a result, this apparatus avoids unsuccessful reading such as a failure to read fully a desired image, even when a document bound along its short edge or its long edge is read for duplex purposes.

In a preferable embodiment of this apparatus, when the document has a top edge which is located uppermost of the document when viewed in a direction allowing an image formed on the first side of the document to erect, the document transport unit transports the document with the top edge being as a leading end in the transport direction of the document, prior to the subsequent reading-stage.

(6) The apparatus according to any one of modes (1)-(5), wherein the document transport unit reverses the transport direction of the document with respect to its original transport direction, prior to the subsequent reading-stage, and wherein the timing controller includes:

(a) a first determining section determining the extension direction of the binding edge, based on first input information;

(b) a second determining section determining whether or not the extension direction of the binding edge determined by the first determining section is parallel to the document orientation; and (c) a timing delaying unit delays the start-of-reading timing of the second side with respect to the start-of-reading timing of the first side, provided that the second determining section has determined that the extension direction of the binding edge is parallel to the document orientation.

In this apparatus, the extension direction of the binding edge of the document is determined based on the first input information, and a determination is made whether or not the extension direction of the binding edge is parallel to the document orientation.

Further, in this apparatus, the start-of-reading timing of the second side is delayed with respect to the start-of-reading timing of the first side, provided that the extension direction of the binding edge is parallel to the document orientation.

In a preferable embodiment of this apparatus, when the document has a top edge which is located uppermost of the document when viewed in a direction allowing an image formed on the first side of the document to erect, the document transport unit transports the document with the top edge being as a leading end in the transport direction of the document, prior to the subsequent reading-stage.

(7) The apparatus according to mode (6), wherein the timing delay unit determines an amount of delay of the start-of-reading timing of the second side with respect to the start-of-reading timing of the first side, based on related information related to a read range of the document within which the image reader reads during each scan, provided that the second determining section has determined that the extension direction of the binding edge is parallel to the document orientation.

The "amount of delay" may be defined, for example, as a delay time or a delay distance or space.

(8) The apparatus according to mode (7), wherein the related information includes setting information for defining the read range, and wherein the timing delay unit determines the amount of delay, based on a difference between a size of the read range defined by the setting information and a size of the document.

(9) The apparatus according to any one of modes (1)-(8), further comprising a variable enlargement/reduction unit enlarging or reducing the images read by the image reader at a desired enlargement/reduction ratio, wherein the related information includes information representative of the desired enlargement/reduction ratio.

(10) The apparatus according to mode (7), further comprising an image recording unit recording images on a record medium based on the images on the first and second sides read by the image reader, wherein the related information includes setting information for defining the read range, and wherein the timing delay unit determines the amount of delay, based on a difference between a size of the read range defined by the setting information and a size of the record medium.

(11) The apparatus according to mode (10), wherein the timing delay unit delays the start-of-reading timing of the second side with respect to the start-of-reading timing of the first side, when the read range defined by the setting information is larger in size than the record medium.

In this apparatus, when the read range on the document is not larger in size than the record medium, the start-of-reading timing of the second side is not delayed with respect to the start-of-reading timing of the first side. In this instance, the second side of the document is read from its leading end (i.e., the aforementioned start-of-reading edge), whereby the image data is produced.

In this apparatus, when the read range on the document is larger in size than the record medium, the start-of-reading timing of the second side is delayed with respect to the start-of-reading timing of the first side.

As a result, this apparatus eliminates unneeded delay of the start-of-reading timing of the second side, avoiding a failure to read fully a desired image due to the unneeded delay.

(12) The apparatus according to mode (5), wherein the image transport unit includes:

a generally U-shaped main transport path along which the document is transported across the reading position; and a reversing path, communicatable with the main transport path, along which the document is transported for allowing the transport direction of the document to be reversed with respect to its original transport direction.

(13) The apparatus according to mode (12), wherein the reversing path is disposed within or outside a space defined by the main transport path.

(14) The apparatus according to mode (5), wherein the document transport unit transports the document such that the document moves across the image reader in the same direction both when the image reader read the first side and when the image reader reads the second side.

This apparatus allows an increase in accuracy in locating a document at the reading position because of a uni-directional reading relative to the reading position.

(15) The apparatus according to mode (5), wherein the image transport unit, having a bi-directional path along which the document is transported for allowing the transport direction of the document to be reversed with respect to its original transport direction, transports the document using the bi-directional path for allowing the second side to be read by the image reader.

(16) The apparatus according to mode (15), wherein the bi-directional path, having its length shorter than a length of a duplex-readable maximum-size document as viewed in portrait-orientation, allows a leading portion of the document, upon entry into the bi-directional path, to move past an end of the bi-directional path, resulting in external exposure.

(17) The apparatus according to mode (15), wherein the document transport unit further includes a generally U-shaped main transport path along which the document is transported, the main transport path having an upper portion disposed upstream and a lower portion disposed downstream in the transport direction of the document, wherein the bi-directional path is disposed so as to be communicatable with the upper portion of the main transport path, and wherein the document transport unit further includes a by-pass path disposed so as to be communicatable with the lower portion of the main transport path and the bi-directional path, to thereby allow the document, upon the first side being read by the image reader, to enter the bi-directional path.

(18) A method of processing images previously-formed on first and second opposite sides of a document, comprising the steps of:

reading the images on the document at a reading position as the document and the reading position move relative to each other per each scan;

transporting the document such that the first side is moved facing the reading position, and, after the first side is read, transporting again the document such that the second side is moved facing the reading position; and controlling at least one of a start-of-reading timing of the first side during a preceding reading-stage at the reading step and a start-of-reading timing of the second side during a subsequent reading-stage at the reading step, such that a relationship between the start-of-reading timing of the first side and the start-of-reading timing of the second side varies, depending on whether or not an extension direction of a binding edge along which the document is to be bound is parallel to a document orientation in which a length of the document is oriented with respect to a transport direction of the document being transported at the transporting step.

(19) A program to be executed in an apparatus using a computer, the program being executed by the computer for implementing the process according to mode (18).

The execution of the install program according to this mode provides the same function and effects as when the process according to the previous mode (18) is practiced.

The "program" in this mode may be interpreted to incorporate not only a combination of instructions implemented by a computer to perform the functions of the program, but also files, data, etc. processed depending on each of the instructions.

(20) A computer-readable storage medium which has stored therein the program according to mode (19).

The execution of the install program which has been stored in the storage medium according to this mode provides the same function and effects as when the process according to the previous mode (18) is practiced.

The "storage medium" in this mode may be realized in different types, including a magnetic recording medium, such as a flexible-disc, an optical recording medium, such as a CD and a CD-ROM, an optical-magnetic recording medium, such as an MO, an un-removable storage, such as a ROM, for example.

Several presently preferred embodiments of the invention will be described in more detail by reference to the drawings in which like numerals are used to indicate like elements throughout.

FIRST EMBODIMENT

Referring now to FIG. 1, there is illustrated in perspective view an all-in-one device 1 exemplified as an image processing device constructed in accordance with a first illustrative embodiment of the present invention.

As illustrated in FIG. 1, the all-in-one device 1 is configured to include: a printer 2 disposed at a lower section of the all-in-one device 1; a scanner 3 disposed above the printer 2; a document cover 6 provided with an Auto Document Feeder (ADF) 4; and a control panel 5 located on a front side of an upper face portion of the all-in-one device 1.

In the present embodiment, the printer 2 constitutes an example of the "image recorder" set forth in the above mode (10), the scanner 3 constitutes an example of the "image reader" set forth in the above mode (1), and the ADF 4 constitutes an example of the "document transport unit" set forth in the same mode.

The all-in-one device 1 is constructed to include the printer 2, the scanner 3, the ADF 4, the document cover 6, and the control panel 5, in a unitary configuration, to thereby achieve a printing function, a scanning function, a copying function, a facsimile function, etc. The all-in-one device 1 is referred to as "multi-function device (MFD)" in the art.

It is added that, although the invention is described herein by way of the exemplified all-in-one device or multi-function device 1 having various functions described above, it is of course that the invention may be applicable to even a stand-alone scanner merely having a scanning function, or a stand-alone copier merely having a scanning function.

The multi-function device 1, which is coupled principally to a computer (not shown), is configured to cause the printer 2 to print graphics, texts, etc. on a print sheet, based on print data including image data, document data, etc. received from the computer. In the present embodiment, the print sheet corresponds to the "record medium" set forth in the above mode (10).

The multi-function device 1 is further configured to transmit image data representative of an image which has been read by the scanner 3, to a storage device such as a hard disc drive (HDD) built in the multi-function device 1, the computer, etc.

The multi-function device 1 has also an ability to cause the printer 2 to print on a print sheet an image of a document which has been read by the scanner 3, without data communication with the computer. The ability is a so-called document copying.

Then, there will be described individual components of the multi-function device 1 below. However, these components are for illustrative purposes of preferred embodiments of the present invention, and may be modified as desired without departing from the spirit of the present invention.

Control Panel

The control panel 5 is disposed on the front side of the upper face portion of the multi-function device 1, in other words, an upper side of a front face portion of the scanner 3, for allowing a user to control the printer 2 and the scanner 3. The control panel 5, which includes various user-operable keys, a liquid-crystal display 11, etc., allows the user to enter a command instructing how the multi-function device 1 operates.

The various user-operable keys are in the form of various input keys including, for example;

a start button 12 for allowing the user to activate the printer 2, the scanner 3, etc.;

a stop button 13 for allowing the user to deactivate the operation, terminate a user's setting operation, etc;

mode selection buttons including a facsimile mode key 14 for allowing the user to select the facsimile function, a scanner mode key 15 for allowing the user to select the scanning function, a copy mode key 16 for allowing the user to select the copying function, etc.;

a numeric keypad 17 for allowing the user to enter the desired number of copies, a desired image-resolution during reading by the scanner 3, a desired enlargement/reduction ratio of a printed image when an image enlargement/reduction function described below is activated, etc.;

a cursor control key 18 for allowing the user to scroll and select items such as function information, setting information and mode information, all of which are displayed on the liquid-crystal display 11; and other setting buttons for allowing the user to specify the settings of the multi-function device 1.

The multi-function device 1 has the image enlargement/reduction function of enlarging or reducing images read or scanned by the scanner 3, based on an enlargement/reduction ratio entered by the user in a copy mode, which function is well known in the art. The image enlargement/reduction function corresponds to the "variable enlargement/reduction unit" set forth in the above mode (9).

In general, there are known as the image enlargement/reduction function, a function of reducing or enlarging an image read or scanned by the scanner 3, by such as decimating or interpolating data indicative of the image read or scanned by the scanner 3, within an image memory; and a function of reducing or enlarging an image read by the scanner 3, by increasing or decreasing a scan rate of an image reading unit 24 described below (i.e., a speed of the image reading unit 24 moving in a secondary scan direction) of the scanner 3, relative to a default rate setting of the image reading unit 24, for reducing or increasing the amount of data indicative of the image which is to be read by the scanner 3.

Although any one of those functions is available to the multi-function device 1, the latter is selected and implemented for the multi-function device 1 in the present embodiment.

For achieving the selected function, on the control panel 5, an enlargement/reduction setting button 20 for allowing the user to select the aforementioned image enlargement/reduction function in a copy mode, a scan mode, etc.

Once the user depresses a predetermined one of buttons of the control panel 5, predetermined input information is transmitted to a controller 80 (see FIG. 7) of the multi-function device 1. As a result, the multi-function device 1 is controlled by the controller 80 so as to perform an operation corresponding to the input information.

For example, once the user depresses the copy mode key 16, the multi-function device 1 is caused to enter a copy mode in which the multi-function device 1 can perform a copy operation. At this time, on the liquid-crystal display 11, there are displayed a current operational status of the multi-function device 1; an operation guide to the user or operator; the setting information; etc.

More specifically, there are displayed on the liquid-crystal display 11:

a guidance message helpful to the user in selecting a duplex copying function (i.e., a double-sided printing function);

a guidance message helpful to the user in entering document type information of a document to be read; etc.

The document type information is identification information useful to the multi-function device 1 in determining whether a current document is a document bound along its long edge or a document bound along its short edge.

In the present embodiment, the identification information corresponds to the "information" set forth in the above mode (2), the "first input information" set forth in the above mode (3), and the "identification information" set forth in the above mode (4).

Once the user depresses the enlargement/reduction setting button 20 in a copy mode, a screen page enabling the user to enter 10 a desired enlargement/reduction ratio is displayed on the liquid-crystal display 11.

It is added that, where the multi-function device 1 is coupled to the computer, as described above, the multi-function device 1 operates based on commands received from the computer via a printer driver, a scanner driver, etc.

Scanner

Figure 2:
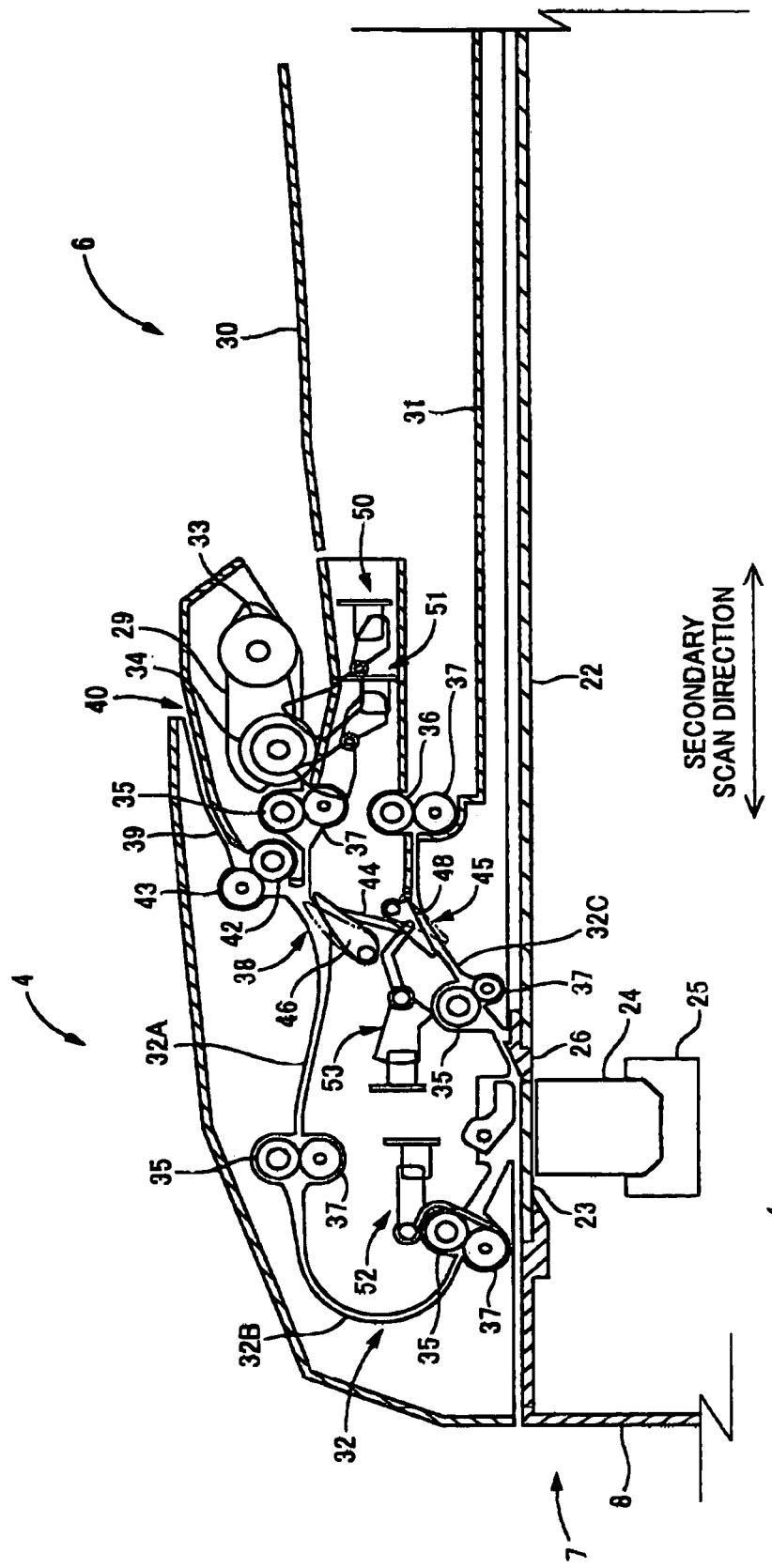
FIG. 2 is a vertical sectional-view illustrating the interior of an ADF (Auto Document Feeder) 4 depicted in FIG. 1.

As illustrated in FIGS. 1 and 2, the scanner 3 includes a document placing table 7 functioning as a Flatbed Scanner (FBS) To the document placing table 7, there is attached the document cover 6 including the ADF 4, namely, an auto document feed mechanism, via at least one hinge fixed to a back side portion of the document cover 6, such that the document cover 6 is openable and closable relative to the document placing table 7.

The document placing table 7 is provided with a body frame 8 generally in the form of a rectangular solid; platen glasses 22, 23 (see FIG. 2) disposed on an upper face portion of the body frame 8; and the image reading unit 24 disposed within the body frame 8. The body frame 8 forms a part of an entire casing of the multi-function device 1.

The platen glasses 22, 23 are each disposed on an upper face portion of the document placing table 7 which faces the document cover 6. Therefore, opening the document cover 6 causes the platen glasses 22, 23 to be exposed so as to act as an upper surface of the document placing table 7.

On the other hand, closing the document cover 6 causes the document placing table 7 including the platen glasses 22, 23, to be covered over the entire upper surface of the document placing table 7.

The image reading unit 24 is disposed within the document placing table 7 so as to face the platen glasses 22, 23. The image reading unit 24 is supported by a carriage 25 so as to be movable in a perpendicular direction (i.e., the secondary scan direction) to the depth direction (i.e., parallel to a primary scan direction) of the multi-function device 1.

The platen glass 22 is used when the scanner 3 is used as the FBS. The platen glass 22, which is adapted to enable a document to be loaded on the platen glass 22, is made up of a transparent glass plate, for example.

At an inside of the upper face portion of the document placing table 7, there is formed an opening which holds the platen glass 22 to be light-transmissive. The platen glass 22 is fitted into the opening with an outer surface of the platen glass 22 being exposed to the outside. The outer surface of the exposed platen glass 22 is entirely assigned to a document readable region of the FBS.

On the other hand, the platen glass 23 is used when an image on a document is read while the document is being fed using the ADF 4. The platen glass 23, which is adapted to establish a scanning position (an exemplary reading position, such as slit-like or elongated area) of the scanner 3, is made up of a transparent glass plate, for example.

The platen glass 23 is disposed so as to extend in the depth direction of the multi-function device 1, over a predetermined length commensurate to the length of a primary scan path of the image reading unit 24.

Between the platen glasses 22 and 23, a locator 26 is interposed. The locator 26 is an elongated plate-like member extending in the depth direction (i.e., parallel to the primary scan direction) of the multi-function device 1, similarly with the platen glass 23.

The locator 26 is employed as a reference member for promoting the user to locate a document on the platen glass 22 at an appropriate position, when the user attempts to place the document on the platen glass 22. In this regard, the platen glass 22 acts as a document loaded surface in the FBS.

To this end, the locator 26 bears on its upper surface, a mark or indicator indicative of a center position, marks or indicators indicative of the positions of opposite edges of documents various in size, when appropriately placed, such as an A4-sized document (210 mm×297 mm), a B5-sized document (182 mm×257 mm), an A5-sized document (148 mm×210 mm), etc.

Further, the leading end of all documents fed over the platen glass 23 are positively caught and deflected upwardly by an upper surface of the locater 26 into ADF 4.

The image reading unit 24 is in the form of a linear array image sensor (i. e., a linear array of image sensor elements) having a primary scan direction parallel to the depth direction of the multi-function device 1.

More specifically, the image reading unit 24 is in the form of a CIS (Contact Image Sensor) which is configured to include a light source, a lens and light-receiving elements in a unitary configuration.

The light source is configured to direct light toward a document through the platen glass 22 or 23. The lens is configured to collect light reflected from the document. The light-receiving elements are such as linear photo sensors which receive the light converged by the lens and convert the converged light into electric signals.

It is added that the image reading unit 24 may be changed in type from the CIS to, for example, a CCD (Charge Coupled Device) image sensor with image-reducing optics, a CMOS (Complementary Metal-Oxide Semiconductor) image sensor, etc.

The carriage 25 is mechanically coupled to a belt drive mechanism which functions as a scanning mechanism. The carriage 25 supports the image reading unit 24 in position below the platen glasses 22, 23, such that the image reading unit 24 is scannable in the secondary scan direction perpendicular to the depth direction of the multi-function device 1.

The carriage 25 is imparted a driving force by a carriage motor 90 (see FIG. 7), to thereby move reciprocally along the platen glasses 22, 23 in the secondary scan direction (i.e., a horizontal direction in FIG. 2), resulting in reciprocal movement of the image reading unit 24 together with the carriage 25.

It is added that, in the present embodiment, since the scanner 3 is used to function as the FBS, the image reading unit 24 is adapted to be scannable along the platen glasses 22, 23.

The scanner 3 may be modified to perform an image reading operation by the use of only movement of a document caused by the ADF 4.

In this modified version, the image reading unit 24 may be merely stationarily disposed under the platen glass 23. In this case, any scanning mechanism is not needed, neither is the platen glass 22 needed.

Auto Document Feeder (ADF)

As illustrated in FIGS. 1 and 2, at an upper face portion of the document cover 6, there are provided a supply tray 30 allowing the user to load documents or sheet materials, and an exit tray 31 allowing the user to unload documents. The supply and exit trays 30, 31 are communicatable with each other by way of a transport path 32.

The ADF 4, included in the document cover 6, is adapted to feed documents automatically and successively from the supply tray 30 to the exit tray 31 through the transport path 32. In the transport process of a document by the ADF 4, the document passes through on the platen glass 23, and during the passing, an image on the document is read by the image reading unit 24 which is stationary or positioned immediately below the platen glass 23. The supply and exit trays 30, 31 are mounted on the upper face portion of the document cover 6 in an upper-lower two-layer configuration. More specifically, under the supply tray 30, the exit tray 31 is disposed.

The supply tray 30 is for use in stacking documents for which an image reading operation using the ADF 4 is to be performed. A plurality of documents are placed and stacked on the supply tray 30, with a first side (i.e., a first face side) of each document facing upwardly, in a manner allowing a leading one of opposite edges of each document in a transport direction to enter the transport path 32.

In the present embodiment, a maximum width of a document which the supply tray 30 can accommodate is set equal to the length (210 mm) of each short edge of an A4-sized document. For this reason, only a vertical feed of an A4-sized document is available, while a horizontal feed thereof is not available.

On the supply tray 30, there are mounted a pair of opposing document guides (i.e., edge guides) 28, 28 (see FIG. 1) which are spaced apart from each other in the depth direction of the multi-function device 1, and which are slidably movable in the depth direction. The document guides 28, 28 are for use in regulating the position of a document placed on the supply tray 30 in the width direction of the document.

Using a well-known link mechanism (not shown), the pair of document guides 28, 28 operate in a linked relation allowing slide movement of one of the document guides 28, 28 to cause slide movement of the other. As a result, after a document is placed on the supply tray 30, slide movement of one of the document guides 28, 28 allows the document to be adjusted so that its center line may be located at a fixed position, whichever a size of the document is.

The exit tray 31, which is disposed under the supply tray 30 to be vertically spaced therefrom, is formed integrally with the document cover 6 at its upper face portion. A document, after exiting the ADF 4, is supported and stacked on the exit tray 31, with the document being separated from other documents previously stacked on the supply tray 30.

It is added that, in the present embodiment, a document is outputted to the exit tray 31 with the first side of the document facing downwardly, as will be described later.

As illustrated in FIG. 2, inside the ADF 4, there is formed the transport path 32 having a generally horizontal U-shape in vertical sectional-view for interconnecting the supply and exit trays 30, 31. The transport path 32 is formed, using members forming the body of the ADF 4, guide plates, etc., as a continuous path having a predetermined width large enough for documents to pass through.

More specifically, the transport path 32 is so shaped as to have;

a first section 32A in which the transport path 32 extends generally horizontally from the supply tray 30 toward one-end side of the document cover 6 (i.e., a left-hand side of the sheet of FIG. 2);

a second section 32B in which the transport path 32, past the first section, curves downwardly for U-turn or inversion (upside-down turn) of the document G, and reaches the scanning position located on the platen glass 23; and a third section 32C in which the transport path 32 extends from the scanning position toward the exit tray 31.

The transport path 32 is generally divided into three sections, which is to say, the first section (hereinafter, referred to as "upper portion") 32A, the second section (hereinafter, referred to as "curved portion") 32B, and the third section (hereinafter, referred to as "lower portion") 32C.

The upper portion 32A and the lower portion 32C respectively correspond to two line segments of the horizontal U-shape which are arrayed in an upper-lower, two-step style. The curved portion 32B interconnects the upper portion 32A and the lower portion 32C so as to form a continuous path.

The transport path 32 is employed as a document travel path for both simplex- and duplex-document reading-purposes using the ADF 4.

At the transport path 32, a transport element is disposed for use in document transport.

More specifically, as illustrated in FIG. 2, the transport element is configured with a pick-up roller 33, a separator roller 34, feed rollers 35, and an exit roller 36, all of which are provided to the transport path 32; and pinch rollers 37 in pressure contact with those rollers, respectively.

It is added that the configuration of each of those rollers together composing the transport element is exemplary, and it is of course that the transport element may be replaced with any one of alternative conventional transport elements by modifying the number of rollers, the layout of rollers, for example.

As illustrated in FIG. 2, in the vicinity of an upstreammost area of the transport path 32, the pick-up roller 33 and the separator roller 34 are disposed.

The pick-up roller 33 is rotatably disposed at a free end of an arm 29 coaxial with a rotation axis of the separator roller 34.

The separator roller 34 is rotatably disposed at a position spaced apart from the pick-up roller 33 in a document transport (feed) direction, in a manner that the separator roller 34 is in contact with one of opposite faces of the transport path 32 which faces the separator roller 34.

The pick-up and separator rollers 33, 34 are adapted to be driven for rotation by use of a driving force transmitted to the pick-up and separator rollers 33, 34 from a document feed motor 91 (see FIG. 7) in the form of a stepping motor. The arm 29 is adapted to be pivoted by use of a driving force transmitted to the arm 29 from the document feed motor 91 (see FIG. 7) in a similar manner.

The pick-up and separator rollers 33, 34, which have the same diameter, are rotated at the same circumferential speed.

At a position facing the separation roller 34, a separation pad is disposed in pressure contact with a roller surface of the separator roller 34, for separating documents by friction.

The feed rollers 35 are in the form of a plurality of rollers disposed at respective positions in the transport path 32. More specifically, the feed rollers 35 are disposed at total four positions, respectively, which is to say:

a position disposed immediately downstream of the separate roller 34;

a position disposed in the upper portion 32A of the transport path 32; and two positions disposed in the lower portion 32C of the transport path 32, which is to say, a position disposed immediately upstream of the scanning position of the image reading unit 24, and a position disposed immediately downstream of the scanning position of the image. reading unit 24.

Figure 7:
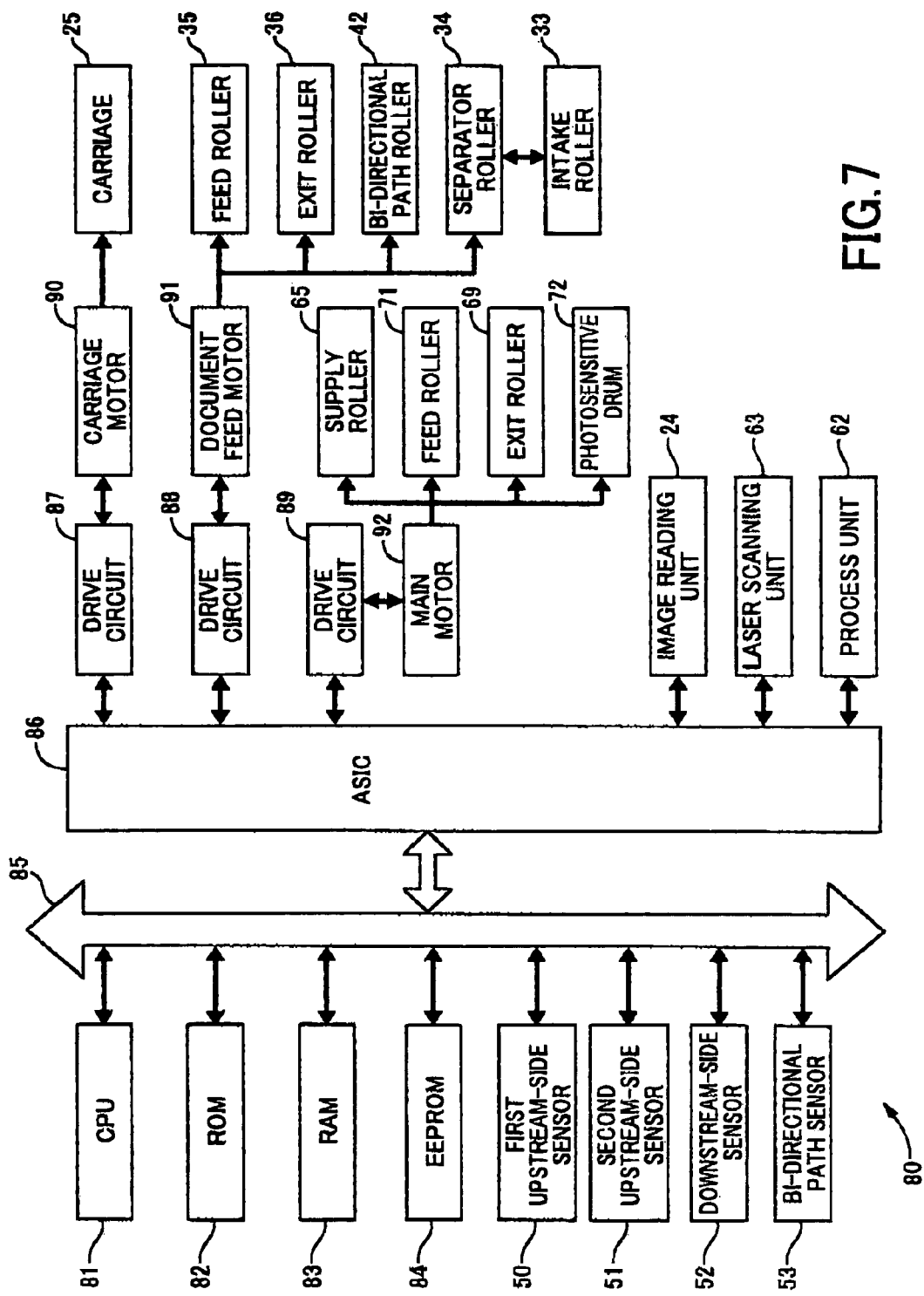
FIG. 7 is a schematic diagram illustrating a controller 80 of the multi-function device 1 depicted in FIG. 1.

These feed rollers 35 are adapted to be driven for rotation by use of a driving force transmitted to the feed rollers 35 from the document feed motor 91 (see FIG. 7). The arrangement of the feed rollers 35 described above is exemplary, and it is of course that the arrangement of the feed rollers 35 may be modified as desired.

At positions facing the feed rollers 35, the pinch rollers 37 are disposed respectively. Each pinch roller 37 is spring-biased at its shaft, whereby each pinch roller 37 is brought into pressure contact with the roller surface of the respective feed roller 35.

Once each feed roller 35 is rotated, the respective pinch roller 37 is also rotated so as to follow rotation of each feed roller 35. These pinch rollers 37 bring a document into pressure contact with the respective feed rollers 35, enabling a rotating force of the feed rollers 35 to be exerted on the document.

The exit roller 36, which is disposed in the vicinity of a downstreammost area of the transport path 32, is adapted to be driven for rotation by use of a driving force transmitted to the exit roller 36 from the document feed motor 91 (see FIG. 7). Also at a position facing the exit roller 36, one of the pinch rollers 37 is disposed in pressure contact with the exit roller 36 with the pinch roller 37 being spring-biased.

Figure 3:
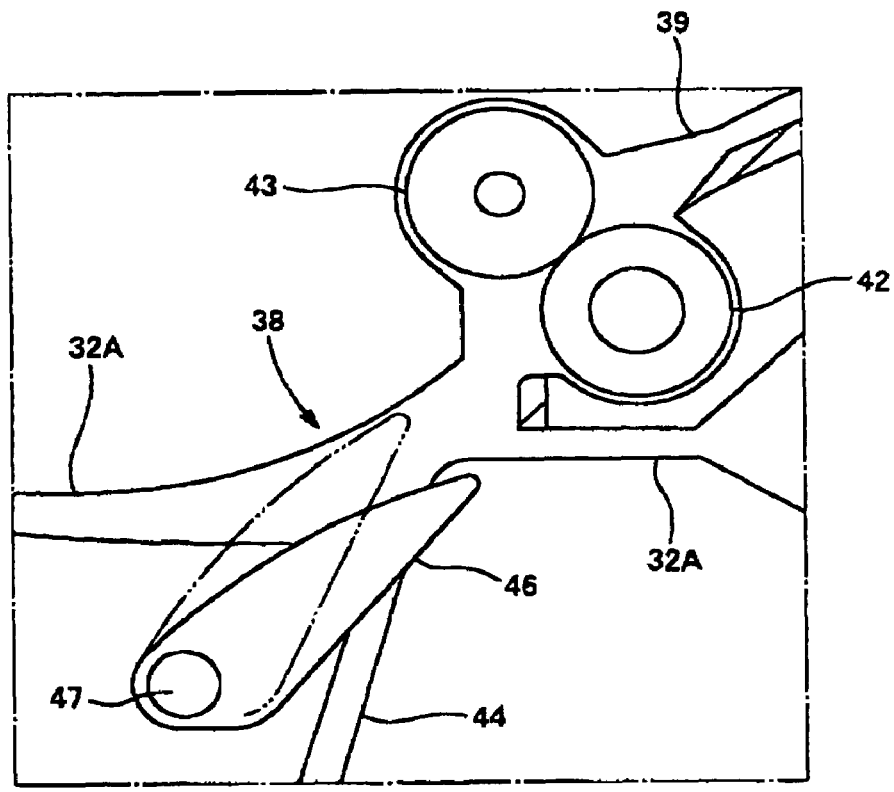
FIG. 3 is a fragmentary vertical sectional-view illustrating in enlargement a portion of the ADF 4 in the vicinity of a junction point 38 depicted in FIG. 2.

As illustrated in FIGS. 2 and 3, to the upper portion 32A of the transport path 32, a bi-directional path 39 is connected. At a junction point 38 between the upper portion 32A and the bi-directional path 39, a guide flap 46 is disposed for use in directing a document to a desired one of selectable paths.

The bi-directional path 39 is shaped so as to branch off from the upper portion 32A of the transport path 32 at the junction point 38, and extend obliquely upwardly toward above the supply tray 30.

The bi-directional path 39 is used for a duplex reading mode, to reverse the transport direction of a document with respect to its original transport direction, after a first side of the document has been read by the image reading unit 24 at the scanning position, to thereby reverse its original trailing end of the document to the new leading edge of the same document.

After the reverse in transport direction, the document is re-fed to the upper portion 32A of the transport path 32.

It is added that the bi-directional path 39 illustrated in FIG. 2 is merely an example of a technique of reversing the transport direction of a duplex document. The bi-directional path 32 may be replaced with its equivalents, provided that the equivalents can achieve a function of reversing the transport direction.

It is further added that the present embodiment employs the bi-directional path 39 disposed outside a space surrounded by the transport path 32, for reversing the transport direction of a duplex document. However, the present invention may be practiced using a bi-directional path disposed outside the space surrounded by the transport path 32, for example.

It is still further added that the present invention may be practiced by employing any kind of a document transfer path, not limited to the bi-directional path 32 or its equivalents, provided that the document travel path enables the transport direction of a document to be reversed.

As illustrated in FIG. 3, the guide flap 46, which is disposed pivotably about a shaft 47, is configured so as to be displaceable between a first position depicted in solid lines and a second position depicted in dashed-two dotted line in FIG. 3.

When the guide flap 46 is situated in the first position depicted in solid lines, the guide flap 46 forms a continuous path from the side (i.e., the right-hand side of the sheet of FIG. 3) of the supply tray 30, to the side (i.e., the left-hand side of the sheet of FIG. 3) of the scanning position of the image reading unit 24. Both sides belong to the upper portion 32A of the transport path 32.

As a result, in the first position of the guide flap 46, a document, upon being fed forward from the supply tray 30, is directed through the junction point 38 toward a position disposed upstream of the scanning position within the upper portion 32A of the transport path 32.

In contrast, when the guide flap 46 is situated in the second position depicted in dashed-two doted line, the guide flap 46 forms a continuous path from a by-pass path 44 to the bi-directional path 39.

As a result, in the second position of the guide flap 46, a document, upon being fed upwardly along the by-pass path 44, is directed through the junction point 38 toward the bi-directional path 39.

Selection of travel paths at the junction point 38 is passively achieved by utilizing abutment a document with the guide flap 46. It is, however, of course that the selection may be actively achieved by utilizing an electronic driving device, for example, a motor.

It is added that, although the present embodiment is described by way of an example in which only the guide flap 46 is disposed at the junction point 38, the present invention may be practiced in an arrangement in which more than one guide flap is disposed at the junction point 38, for smoothing travel of a guided document when passing through the junction point 38.

As illustrated in FIGS. 1 and 2, the bi-directional path 39 has an exit 40 located at the upper face portion of the ADF 4, and exposed to the outside. The exit 40 is located above the supply tray 30, and achieves communication with the outside, at the upper face portion of the ADF 4.

The bi-directional path 39 has its document travel distance shorter than the length of an A4-sized document as viewed in portrait-orientation of the A4-sized document (i.e., the length of each long edge of the A4-sized document). In the present embodiment, a duplex-readable maximum-size document is set equal to the length of the A4-sized document.

Further, the ADF 4 is configured such that, upon entry of a document into the bi-directional path 39, the document ultimately reaches a position allowing a portion of the document to pass through the exit 40 and to be exposed to the outside of the ADF 4.

For this reason, the bi-directional path 39 is not required to secure the document travel distance not shorter than the length of a readable-maximum-size document as viewed in its transport direction.

At the bi-directional 39, a bi-directional path roller 42 is disposed. The bi-directional path roller 42 is adapted to be driven for bi-directional rotation by use of a driving force transmitted from the document feed motor 91 (see FIG. 7) to the bi-directional path roller 42.

At an opposite position to the bi-directional path roller 42, a pinch roller 43 is disposed. The pinch roller 43 is spring-biased at its shaft, whereby the pinch roller 43 is brought into pressure contact with a roller surface of the bi-directional path roller 42, resulting in rotation of the pinch roller 43 so as to follow rotation of the bi-directional path roller 42.

The pinch roller 43 brings a document into pressure contact with the bi-directional path roller 42, enabling a rotating force of the bidirectional path roller 42 to be exerted on the document. The bi-directional path roller 42 and the pinch roller 43 collaborate to achieve a function of reversing the transport direction of the document.

At the lower portion 32C of the transport path 32, and on a downstream side of the scanning position of the image reading unit 24, wherein the scanning position is located on the platen glass 23, the by-pass path 44 is formed for use in directing a document to the bi-directional path 39.

More specifically, the by-pass path 44 is shaped so as to branch off from a branching point 45, and so as to extend obliquely upwardly so that the by-pass path 44 may be merged with the upper portion 32A of the transport path 32 at the junction point 38. The branching point 45 is located at the lower portion 32C of the transport path 32, and on the downstream side of the scanning position of the image reading unit 24. As a result, at the junction point 39, the by-pass path 44 is merged with the bi-directional path 39 at its entrance.

As will be evident from the above, in the present embodiment, the junction point 38, at which the bi-directional path 39 is branched off from the transport path 32 generally in the horizontal U-shape, is arranged in the upper portion 32A of the transport path 32. On the other hand, the branching point 45, at which the by-pass path 44 is branched off from the transport path 32, is arranged in the lower portion 32C of the transport path 32.

The by-pass path 44 is provided for selectively enabling the downstream side of the scanning position to communicate with the by-directional path 39.

The arrangement facilitates the vicinity of the curved portion 32B of the transport path 32 to be structurally simplified.

It is noted that the by-pass path 44 is provided for directing a document to the bi-directional path 39, after a first side of the document has been read by the image reading unit 24 at the scanning position, for achieving a duplex reading operation.

Figure 4:
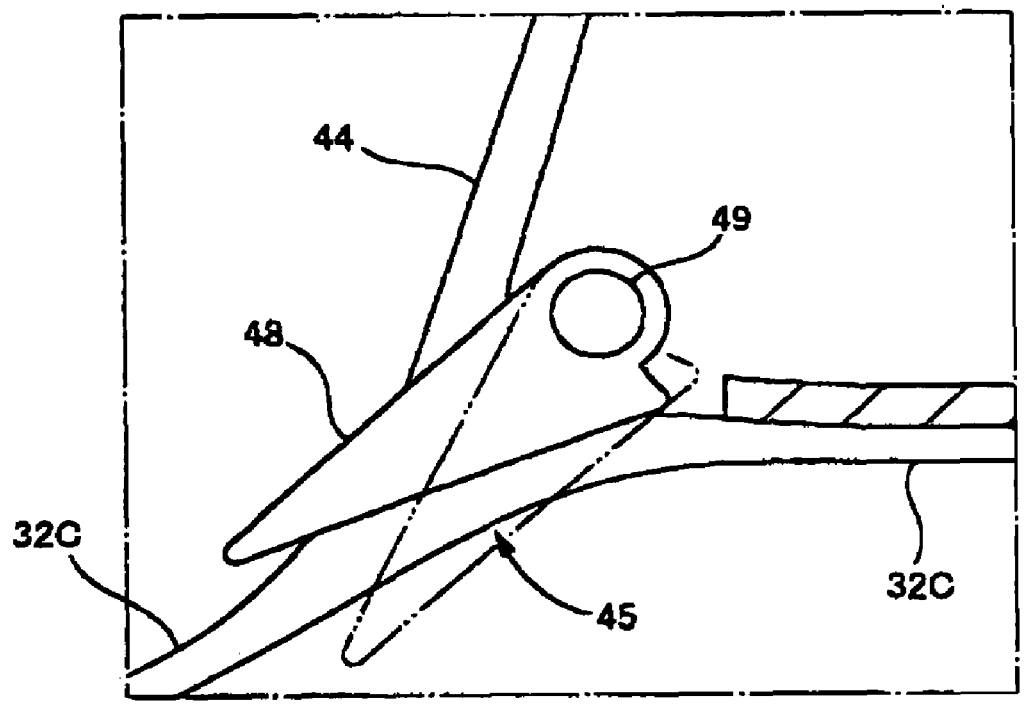
FIG. 4 is a fragmentary vertical sectional-view illustrating in enlargement a portion of the ADF 4 in the vicinity of a branching point 45 depicted in FIG. 2.

As illustrated in FIG. 4, at the branching point 45, a guide flap 48 is disposed. The guide flap 48, which is disposed pivotably about a shaft 49, is configured so as to be displaceable between a first position depicted in solid lines and a second position depicted in dash-dot-dot lines in FIG. 4.

When the guide flap 48 is situated in the first position depicted in solid lines, the guide flap 48 forms a continuous path from the side (i.e., the left-hand side of the sheet of FIG. 4) of the scanning position of the image reading unit 24, to the side (i.e., the right-hand side of the sheet of FIG. 4) of the exit tray 31. Both sides belong to the lower portion 32C of the transport path 32.

As a result, in the first position of the guide flap 48, a document, upon passing through the scanning position of the image reading unit 24, is directed through the branching point 45 toward the exit tray 31 along the lower portion 32C of the transport path 32.

In contrast, when the guide flap 48 is situated in the second position depicted in dash-dot-dot lines, the guide flap 48 forms a continuous path from the downstream side of the lower portion 32C of the transport path 32, the downstream side being disposed downstream of the scanning position of the image reading unit 24, to the by-pass path 44.

As a result, in the second position of the guide flap 48, a document, upon passing through the scanning position of the image reading unit 24, is directed through the branching point 45 toward the by-pass path 44.

Selection of travel paths at the branching point 45 is achieved by utilizing an electronic driving device, for example, a motor (not shown) operatively associated with or mechanically coupled to the shaft 49 of the guide flap 48.

Paper Edge Sensors

As illustrated in FIG. 2, the transport path 32 and the by-pass path 44 are provided with a plurality of sensors for use in detecting a document transport status.

More specifically, the transport path 32 is provided with a first upstream-side sensor 50 disposed upstream of the separator roller 34, and a second upstream-side sensor 51 disposed downstream of the separator roller 34.

Further, the transport path 32 is provided with a downstream-side sensor 52 disposed immediately upstream of the scanning position of the image reading unit 24. Still further, the by-pass path 44 is provided with a bi-directional path sensor 53.

Common Configuration of Paper Edge Sensors

Each of these sensors, which is a so-called optical sensor, is in common in construction to each other, excepting the shape or the like of a detecting part of each sensor varies with a position at which a document is to be detected. Therefore, the configuration of each sensor will be described below by way of an example of the first upstream-side sensor 50.

Figure 5:
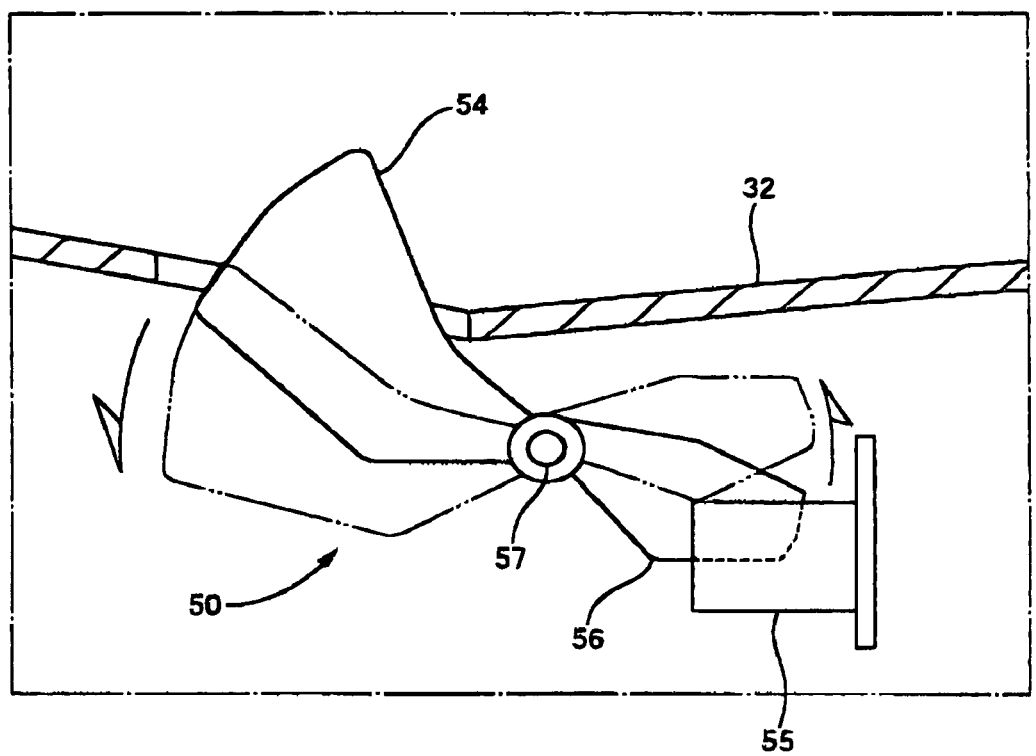
FIG. 5 is a fragmentary vertical sectional-view illustrating in enlargement an upstream-side sensor 50 depicted in FIG. 2.

As illustrated in FIG. 5, the first upstream-side sensor 50 is constructed to include a detecting part 54 and a photo interrupter 55.

The detecting part 54 is configured so as to selectively project out from a support surface of the transport path 32, and pivot in a direction away from the support surface of the transport path 32, upon being brought into contact with a moving document. On the other hand, the photo interrupter 55 is configured so as to detect pivot motion of the detecting part 54.

The detecting part 54, which is formed integrally with a shielding part 56 of the first upstream-side sensor 50, is disposed pivotably about a shaft 57. The shielding part 56 is to be detected by the photo interrupter 55.

The detecting part 54 is elastically biased by a biasing member such as a spring (not shown), in a direction allowing the detecting part 54 to project out from the support surface of the transport path 32, which is to say, in a clockwise direction in FIG. 5.

As illustrated in solid lines in FIG. 5, in the absence of an external force applied, the detecting part 54 projects out from the support surface of the transport path 32, and the shielding part 56 is positioned to be interposed between a light emitting element (not shown) and a light receiving element (not shown) of the photo interrupter 55.

In this position, the shielding part 56 interrupts light transmission within the photo interrupter 55, resulting in turning OFF of the first upstream-side sensor 50.

On the other hand, once a document is placed on the supply tray 30, the document abuts the detecting part 54, to thereby pivot the detecting part 54 in a direction away from the support surface of the transport path 32.

At this time, the shielding part 56 pivots together with the detecting part 54, resulting in movement of the shielding part 56 in a direction away from a position between the light emitting element and the light receiving element of the photo interrupter 55, as illustrated in FIG. 5 in dash-dot-dot lines.

In this position, the shielding part 56 fails to interrupt light transmission within the photo interrupter 55, resulting in turning ON of the first upstream-side sensor 50.

First Upstream-Side Sensor

As will be evident from the above, by determining whether the first upstream-side sensor 50 is in an ON state or an OFF state, there is identified whether or not a document has been placed on the supply tray 30, which is to say, whether a document is present or absent on the supply tray 30.

Second Upstream-Side Sensor

The second upstream-side sensor 51, which is disposed immediately downstream of the separator roller 34, is adapted to detect a leading edge and/or a trailing end of a document which has been fed into the transport path 32, by determining whether the second upstream-side sensor 51 is in an ON state or an OFF state.

For example, the number of rotations of a representative one of the feed rollers 35 occurring since the second upstream-side sensor 51 detected a trailing end of a document being transported is counted, in terms of the number of steps taken by an encoder or the document feed motor 91 (see FIG. 7) since the detection of the trailing end, or any other physical quantity equivalent to the number of steps.

It is added that all the feed rollers 35 are driven by the document feed motor 91 in common, and therefore, share the number of rotations occurring during the same period.

It is further added that the document feed motor 91 is in the form of a step motor, a three-phase brushless DC motor, etc.

The encoder may be operatively associated with the document feed motor 91 or the representative feed roller 35. The encoder may be coupled directly to the document feed motor 91 or through a gear or belt.

By use of the number of rotations counted, a determination is made as to whether or not the trailing end of the same document passed through the junction point 38.

Downstream-Side Sensor

The downstream-side sensor 52, which is disposed immediately upstream of the scanning position of the image reading unit 24, is adapted to detect a leading and trailing ends of a document being transported along the transport path 32, by determining whether the downstream-side sensor 52 is in an ON state or an OFF state.

Describing the first use of the downstream-side sensor 52 more specifically, the number of rotations of the representative feed roller 35 occurring since the downstream-side sensor 52 detected a selected one of a leading edge and a trailing end of a document being transported is counted in terms of the number of steps taken by the encoder or the document feed motor 91 (see FIG. 7) since the detection of the selected edge, or any other physical quantity equivalent to the number of steps.

By use of the number of rotations counted, a determination is made as to whether or not the selected edge of the same document reached the scanning position of the image reading unit 24.

Describing the second use of the downstream-side sensor 52 more specifically, by counting the number of rotations of the representative feed roller 35 which occurred since the downstream-side sensor 52 previously detected a leading edge of a document being transported until the downstream-side sensor 52 subsequently detected a trailing end of the same document, the length of the same document is measured in its transport direction by calculation.

In the present embodiment, a maximum width of a document which the supply tray 30 can accommodate is set equal to the length of a short edge of an A4-sized document (210 mm). As a result, the calculation of the length of a document in its transport direction can determine a size of the document in almost all cases.

For example, if the calculated length of a document is equal to 297 mm, then the document is identified as an A4-sized document. If the calculated length of a document is equal to 257 mm, then the document is identified as a b5-sized document. If the calculated length of a document is equal to 210 mm, then the document is identified as an A5-sized document.

It is added that a determination as to whether or not a selected one of leading and trailing ends of a document being transported reached the scanning position of the image reading unit 24; calculation of the length of a document being transported in its transport direction; and identification of the size of a document being transported are made or performed by use of a CPU (Central Processing Unit) 81 of a controller 80 described below.

The image reading operation by the image reading unit 24 is controlled based on an output signal of the downstream-side sensor 52.

More specifically, for reading each face side of a document to be read, a current image reading operation, normally, starts at the same timing that a leading edge of a current document being transported reached the scanning position of the image reading unit 24, and the current image reading operation terminates at the same timing that a trailing end of the current document reached the scanning position of the image reading unit 24.

In the present embodiment, when a predetermined condition is met, a start-of-reading timing with which the image reading unit 24 starts reading a second side of a current document is, exceptionally, delayed with respect to a normal start-of-reading timing with which the image reading unit 24 normally starts reading the second side of the current document.

It is added that the normal start-of-reading timing for the second side of the current document is coincident with a timing with which a leading edge of the current document reached the scanning position of the image reading unit 24.

The start-of-reading timing delay processing is performed by the CPU 81 in the procedure illustrated in flow chart (see FIG. 8) described later.

Bi-Directional Path Sensor

The bi-directional path sensor 53, which is disposed at the by-pass path 44, is adapted to detect a leading or trailing end of a document being transported along the by-pass path 44, by determining whether the bi-directional path sensor 53 is in an ON state or an OFF state.

For example, the number of rotations of the representative feed rollers 35 or the bi-directional path roller 42 occurring since the bi-directional path sensor 53 detected a trailing end of a document being transported is counted, in terms of the number of steps taken by the encoder or the document feed motor 91 (see FIG. 7) since the detection of the trailing end, or any other physical quantity equivalent to the number of steps.

It is added that all the feed rollers 35 and the bi-directional path roller 42 are driven by the document feed motor 91 in common, and therefore, share the number of rotations occurring during the same period.

By use of the number of rotations counted, a determination is made as to whether or not the trailing end of the same document passed through the junction point 38.

Printer

Figure 6:
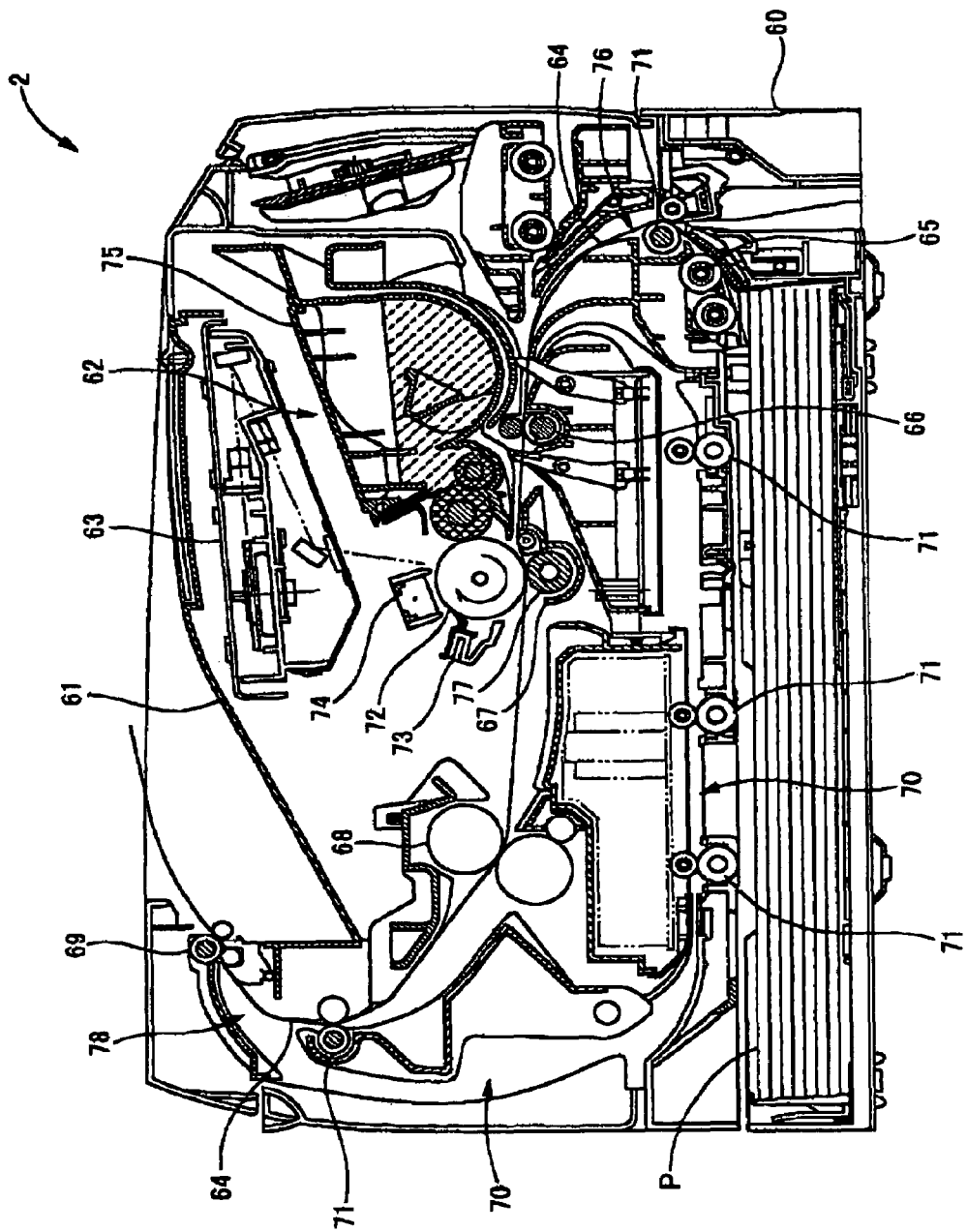
FIG. 6 is a schematic vertical sectional-view illustrating a printer 2 depicted in FIG. 1.

Referring now to FIG. 6, the printer 2 is illustrated in schematic sectional-view. With reference to the same figure, the interior structure of the printer 2 will be briefly described below.

The printer 2 is for use in image forming process of a so-called electro photographic type. The printer 2 is generally constructed to include a paper cassette 60 disposed at a bottom section of the printer 2; and an exit tray 61 disposed at an upper face portion of the printer 2.

The printer 2 further includes: a process unit 62; a laser scanning unit 63; and a main transport path 64 generally in a horizontal S-shape extending from a front side (i.e., the right-hand side of the sheet of FIG. 6) of the paper cassette 60 to a rear side (i.e., the left-hand side of the sheet of FIG. 6) of the exit tray 61.

The printer 2 sill further includes: a supply roller 65; registration rollers 66; a transfer unit 67; a fuser unit 68; and an exit roller 69. These rollers are arrayed in the sequence set forth above, so as to form a line extending along the main transport path 64.

The printer 2 yet further includes a reversing path 70 for reversing a transport direction of a print sheet, after a desired image has been printed on a first side of the print sheet, and then directing the printed print sheet toward an upstream area of the main transport path 64.

The reversing path 70 is formed within the printer 2 such that the reversing path 70 extends from a rear side of the printer 2 through above the paper cassette 60 up to a position disposed upstream of the process unit 62.

It is added that, at the main transport path 64 and the reversing path 70, a plurality of feed rollers 71 are provided with appropriate number and at appropriate positions.

The process unit 62 is configured to include a photosensitive drum 72 disposed opposite to the transfer unit 67, with the main transport path 64 being interposed between the process unit 62 and the transfer unit 72.

The process unit 62 further includes: an electrically-conductive brush 73; a charger unit 74; a developer unit 75; etc., all of which are arrayed in the sequence set forth above, so as to form a unidirectional line extending around the periphery of the photosensitive drum 72, from an upstream side (i.e., the side of the transfer unit 67) to a downstream side of a unidirectional rotational travel of the photosensitive drum 72.

It is added that the image formation process employed in the printer 2 constructed according to the present embodiment may be modified as desired, and it is of course that the type of the image formation process, not limited to an electrophotographic type, may be for example, a ink-jet type, or a thermal (heat-sensitive) type.

In operation, once a user manipulates the control panel 5 to select a copy mode, and if the user depresses the start button 12, a main motor (see FIG. 7) of the printer 2 constructed as described above is activated. A driving force of the main motor 92 is transmitted to a drive train including the photosensitive drum 72; and the supply roller 65, the feed rollers 71, the exit roller 69, etc., for driving the drive train for rotation.

Because of the charger unit 74, a surface of the photosensitive drum 72 being driven for rotation is charged to a predetermined potential (e.g., hundreds of volts).

Data indicative of an image read by the image reading unit 24 is transmitted to the laser scanning unit 63. Thereafter, by use of the laser scanning unit 63, the surface of the photosensitive drum 72 which has been charged to the predetermined potential, is laser-scanned. As a result, a corresponding electrostatic latent image is formed on the photosensitive drum 72.

Once the photosensitive drum 72 rotates until the formed electrostatic latent image reach a position opposite to the developer unit 75, the developer unit 75 allows a developer material to move up to the electrostatic latent image, with the result that the electrostatic latent image is developed into a corresponding developer image formed with a developer material contained in the developer unit 75.

Because of rotation of the supply roller 65 caused by the main motor 92 (see FIG. 7), a print sheet P is picked up from the paper cassette 60 and fed forward into the main transport path 64.

The print sheet P is fed from the paper cassette 60 through a curved portion 76 of the main transport path 64 into the transfer unit 67. The curved portion 76 allows the print sheet P to be inverted (i.e., turned upside down) and then enter the transfer unit 67.

At the transfer unit 67, the entered print sheet P is charged, while the print sheet P is fed forward with the print sheet P being held by and between the photosensitive drum 72 and a transfer roller 77. The transfer roller 77 is rotated at the same circumferential speed as the photosensitive drum 72.

As a result, the developer image which has been carried on the surface of the photosensitive drum 72 is transferred onto a first side (i.e., a first face side) of the print sheet P.

If the photosensitive drum 72, after transfer of the developer image by the transfer unit 67, further rotates, then a residual developer material is removed from the photosensitive drum 72 by the electrically-conductive brush 73 which is disposed at the downstream side of the unidirectional rotational travel of the photosensitive drum 72, in slide contact with the surface of the photosensitive drum 72.

Subsequently, the print sheet P, having the first side onto which the developer image has been transferred by the transfer unit 67, is fed forward into the fuser unit 68 which is disposed downstream of the transfer unit 67 in a feed direction of the print sheet P.

At the fuser unit 68, the developer material on the print sheet P is heat-fused under pressure. As a result, a desired image is printed on the first side of the print sheet P.

Thereafter, the print sheet P is fed forward through a curved portion 78 of the main transport path 64 into the exit tray 61, with the aid of the exit roller 69, with the first side of the print sheet P facing downwardly.

Alternatively, if not a simplex copy function but a duplex copy function was selected in a copy mode, then at a stage at which the print sheet P, after printing an image on the first side of the print sheet P, attempts to exit with the aid of the exit roller 69, the exit roller 69 is deactivated with a trailing end of the print sheet P being nipped by and between the exit roller 69 and an opposite roller or the like.

Subsequently, the exit roller 69 is reversed in rotation direction, and the print sheet P is fed in a reverse direction. At this time, a leading edge of the print sheet P being fed is directed so as to enter not the main transport path 64, but the reversing path 70.

The print sheet P is fed forward along the reversing path 70 because of the associated ones of the feed rollers 71, and eventually the print sheet P reaches a junction point disposed upstream of the process unit 62, more exactly, upstream of a nip zone formed between the photosensitive drum 72 and the transfer roller 77. At any rate, at the junction point, the reversing path 70 is merged with the main transport path 64.

As a result, the print sheet P is fed with its second side, which is opposite to the first side, facing the photosensitive drum 72. In a similar manner, a desired image is printed on the second side of the print sheet P, and ultimately the print sheet P is delivered to the exit tray 61.

It is added that, if the print sheet P is required to exit with its first side facing downwardly even when the duplex copy function was selected, the printer 2 may be modified to feed again the print sheet P to the reversing path 70, after its second side has been printed, direct the print sheet P again to the transport path 64, and, without printing again on the print sheet P, deliver the print sheet P to the exit tray 61.

Controller

Next, the controller 80 will be described which is for use in control of the operations of the multi-function device 1. In FIG. 7, the configuration of the controller 80 built in the multi-function device 1 is illustrated.

As illustrated in FIG. 7, the controller 80 is in the form of a micro computer principally comprised of a CPU (Central Processing Unit) 81, a ROM (Read Only Memory) 82, a RAM (Random Access Memory) 83, an EEPROM (Electrically Erasable and Programmable ROM) 84, etc. Via a bus 85, the micro computer is electrically coupled to an ASIC (Application Specific Integrated Circuit) 86.

In the ROM 82, various programs and so on have been previously stored which are for use in control of various operations of the multi-function device 1. The RAM 83 is used as a storage area or a work area for use in temporal storage of various sets of data used for the CPU 81 to execute the above-mentioned programs.

It is added that the CPU 81 executes the processing or program following the procedure illustrated in a flow char diagram (see FIG. 8) described below, to thereby embody the "first determining section," the "second determining section," and the "timing delay unit" each set forth in the above modes (b 3) and (6).

By the direction of the CPU 81, the ASIC 86 generates phase-energization signals to be delivered to the carriage motor 90, which drives the carriage 25; the document feed motor 91, which drives rollers such as the feed rollers 35 in the ADF 4; the main motor 92, which drives the drive train in the printer 2 (e.g., the photosensitive drum 72; the supply roller 65, the feed rollers 71, the exit roller 69, etc.).

The ASIC 86 delivers the generated phase-energization signals to drive circuits 87, 88, 89 for the carriage motor 90, the document feed motor 91, and the main motor 92 (for use in feeding of print sheets), respectively.

Via the drive circuits 87, 88, 89, drive signals are supplied to the carriage motor 90, the document feed motor 91, and the main motor 92, to thereby achieve rotation control of each motor 90, 91, 92.

The drive circuit 87 is for use in driving the carriage motor 90 within the scanner 3, which is coupled to the carriage 25 in support of the image reading unit 24, so that the image reading unit 24 may be movable relative to a document to be read by the image reading unit 24. The drive circuit 87 is configured to generate an electrical signal for enabling the carriage motor 90 to rotate, in response to a corresponding output signal of the ASIC 86.

In response to the generated electrical signal, the carriage motor 90 rotates, and the rotating force is transmitted from the carriage motor 90 through a well-known scanning mechanism to the carriage 25, resulting in movement of the image reading unit 24.

The drive circuit 88 is for use in driving the document feed motor 91, which is coupled in common to the separator roller 34, the feed rollers 35, the exit roller 36 and the bi-directional path roller 42 within the scanner 3. The drive circuit 88 is configured to generate an electrical signal for enabling the document feed motor 91 to rotate, in response to a corresponding output signal of the ASIC 86.

In response to the generated electrical signal, the document feed motor 91 rotates, and the rotating force is transmitted from the document feed motor 91 through a well-known drive mechanism to the associated rollers 34, 35, 36, 42. The drive mechanism may be configured to include gears, drive shafts, etc.

The pick-up roller 33 within the scanner 3 is driven for rotation by use of a rotating force received from the separator roller 34 through a drive transmitting mechanism (not shown).

The drive circuit 89 is for use in driving the main motor 92, which is coupled the drive train within the printer 2, which includes the photosensitive drum 72; and the supply roller 65, the feed rollers 71, and the exit roller 69. The drive circuit 89 is configured to generate an electrical signal for enabling the main motor 92 to rotate, in response to a corresponding output signal of the ASIC 86.

In response to the generated electrical signal, the main motor 92 rotates, and the rotating force is transmitted from the main motor 92 through a well-known drive mechanism configured to include gears, drive shafts, etc. to the drive train including such as the photosensitive drum 72 and supply roller 65.

To the ASIC 86, the image reading unit 24 is electrically connected. The image reading unit 24 is configured to include a light source, and a photoelectric converting device for converting image light reflected from a document read by the image reading unit 24, into image data indicative of the read image.

By the direction of the CPU 81, the ASIC 86 generates an electrical signal for enabling the light source to emit light, a start-of-reading timing signal for instructing an image reading operation to start, and a timing signal for enabling the photoelectric converting device to output the produced image data. The ASIC 86 then delivers the generated electrical signals to the image reading unit 24.

In response to the generated electrical signals, the image reading unit 24 is operated so as to cause the light source to emit light to illuminate a document to be read, with a corresponding timing, so as to start an image reading operation for the current document, and so as to cause the photoelectric converting device to output the produced image data indicative of an image on the current document.

To the ASIC 86, there are electrically connected the components of the printer 2 including such as the laser scanning unit 63 and the process unit 62, which are controlled by the ASIC 86 by the direction of the CPU 81, as well.

As illustrated in FIG. 7, the sensors disposed at the transport path 32, the by-pass path 44 and the supply tray 30 within the scanner 3, which is to say, the first and second upstream-side sensors 50, 51, the downstream-side sensor 52, and the bi-directional path sensor 53 are electrically connected to the ASIC 86, and further connected to the CPU 81, the ROM 82, the RAM 83, and the EEPROM 84, via the bus 85.

The CPU 81 monitors the statuses of sensor output signals of those sensors 50, 51, 52, 53, and outputs predetermined command signals to the ASIC 86, according to status changes of the monitored sensor output signals.

Image Reading Processing Including Start-of-Reading Timing Delay Processing

Then, with reference to FIGS. 9 to 15, there will be described below the operation of the multi-function device 1 performed in a duplex copy mode (including a duplex reading operation).

In particular, with reference to a flow chart of FIG. 8, there will be described an exemplary procedure of image reading processing (including start-of-reading timing delay processing) performed by the CPU 81 of the controller 80 in the duplex copy mode.

Figure 22:
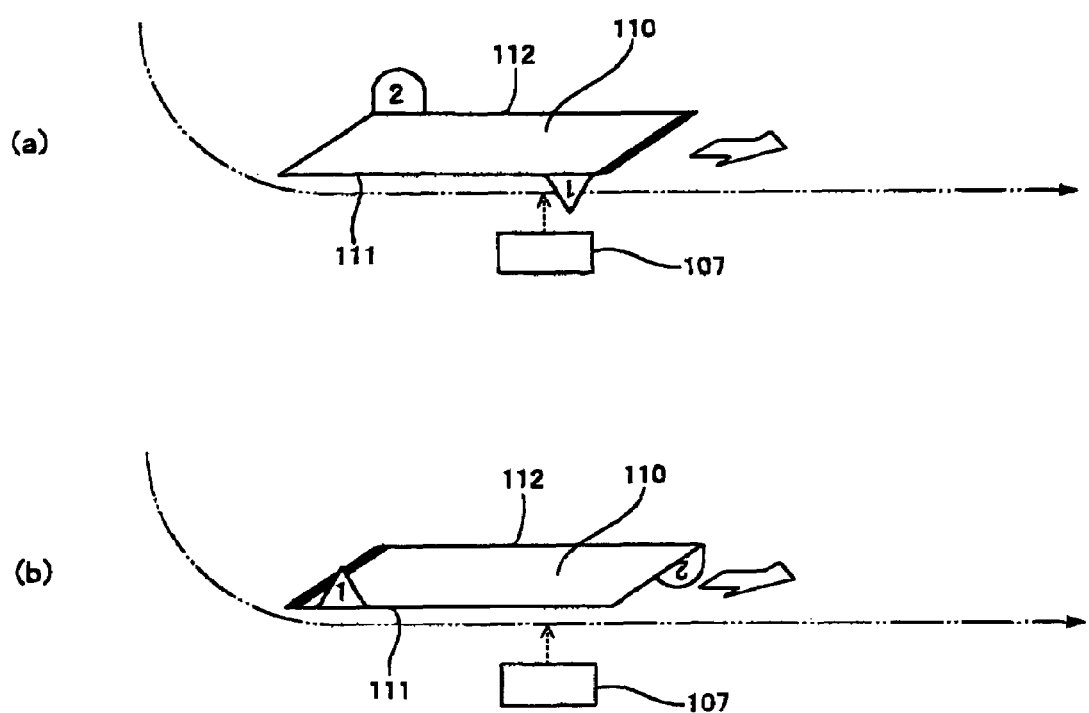
FIG. 22(a) is a schematic perspective view illustrating how the first side of the document 110 is transported in portrait orientation.
FIG. 22(b) is a schematic perspective view illustrating how the second side of the document 110 is transported in portrait orientation, according to the conventional image reading apparatus.
Figure 23:
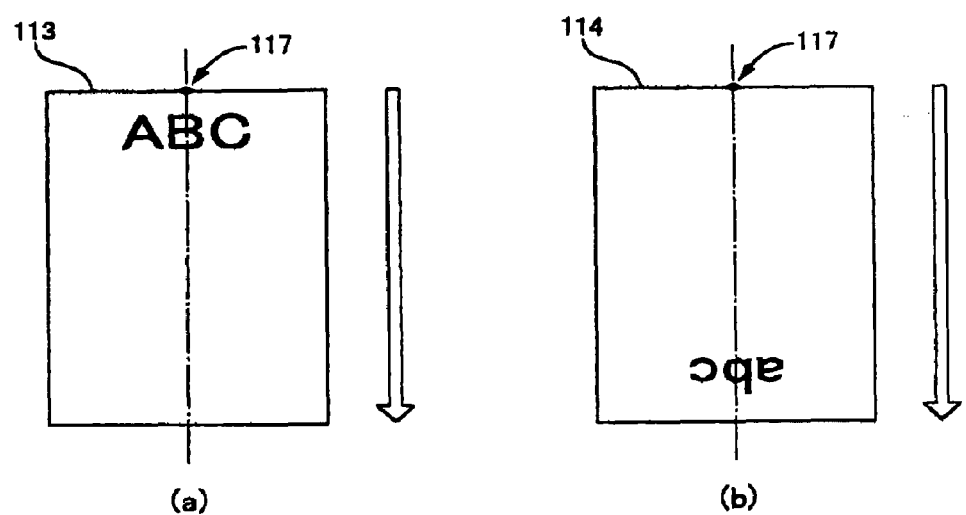
FIG. 23(a) is a schematic top plan view illustrating an exemplary image of the first side of the document 110 which has been read.
FIG. 23(b) is a schematic top plan view illustrating an exemplary image of the second side of the document 110 which has been read, according to the conventional image reading apparatus.
Figure 24:
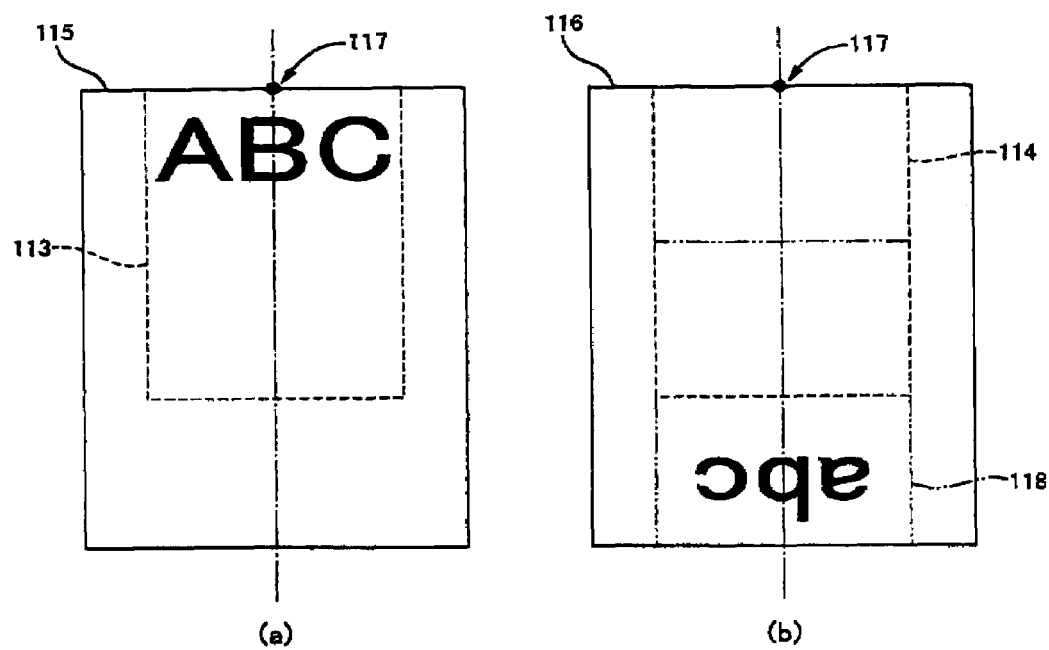
FIG. 24(a) is a schematic top plan view illustrating an exemplary enlarged image of the first side of the document 110.
FIG. 24(b) is a schematic top plan view illustrating an exemplary enlarged image of the second side of the document 110, according to the conventional image reading apparatus.
Figure 25:
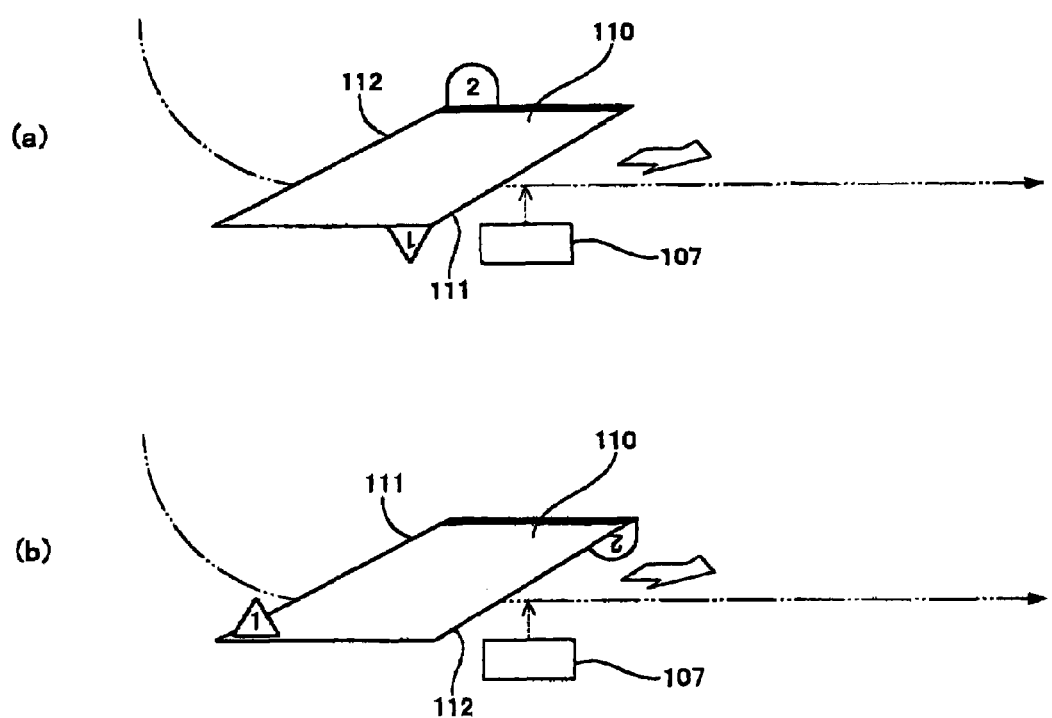
FIG. 25(a) is a schematic perspective view illustrating how the first side of the document 110 is transported in landscape orientation.
FIG. 25(b) is a schematic perspective view illustrating how the second side of the document 110 is transported in landscape orientation, according to the conventional image reading apparatus.

The exemplary procedure is performed, provided that a document G to be read and a print sheet to be printed are both A4-sized, and that the document G is transported only in vertical orientation (i.e., portrait orientation) in the multi-function device 1, as illustrated in FIG. 22.

Further, in the multi-function device 1, when a document G to be read has a top edge which is located uppermost of the document G when viewed in a direction allowing an image formed on a first side of the document G to erect, the document G is transported with the top edge being as a leading edge in the transport direction of the document G.

Figure 8:
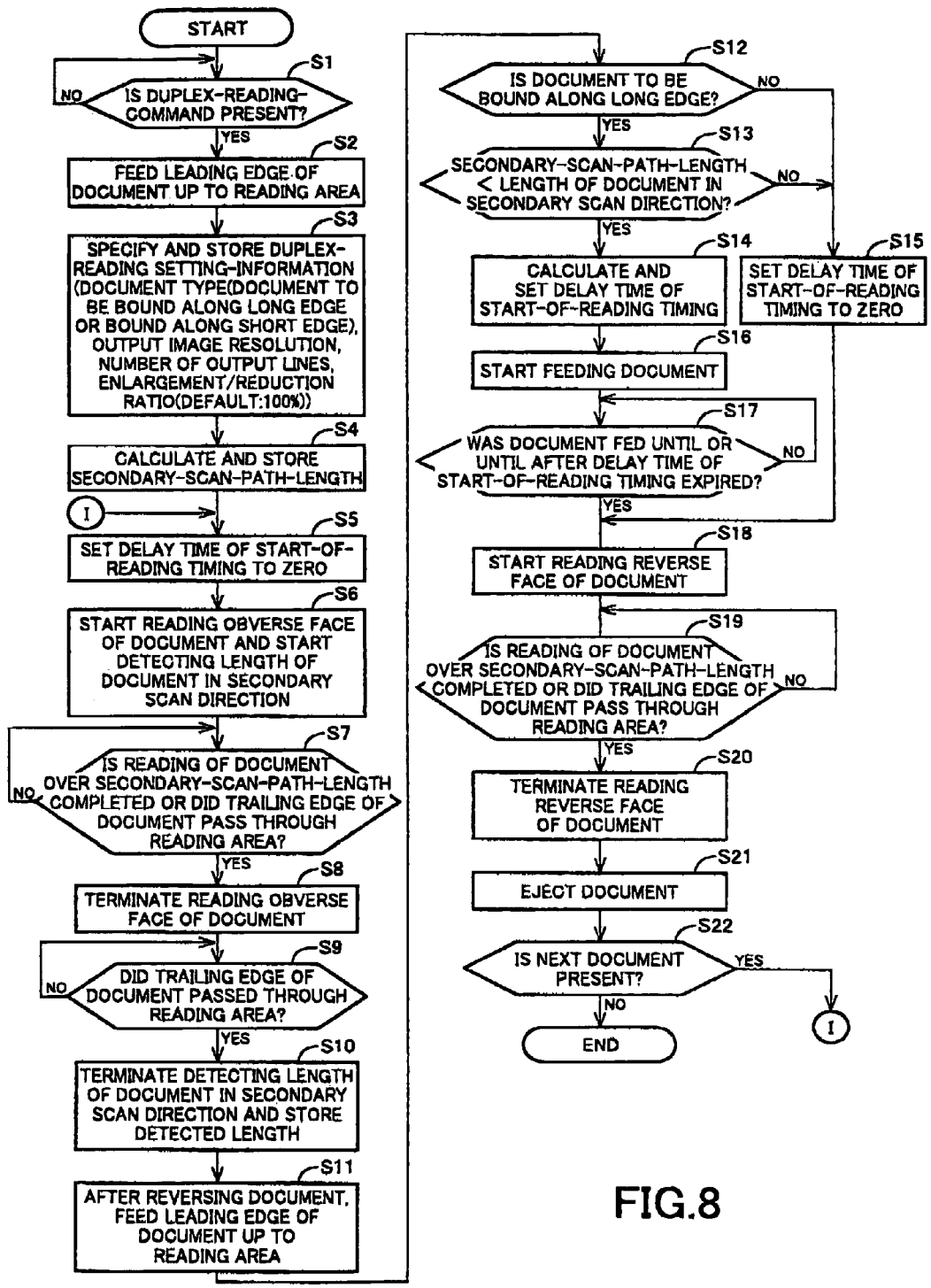
FIG. 8 is a flow chart for explaining an exemplary procedure of start-of-reading timing delay processing to be implemented by a CPU 81 depicted in FIG. 7.

FIG. 8 is a flow chart illustrating the procedure of the processing performed by the CPU 81 when a document G is duplex-read. In this figure, "S1," "S2," . . . are reference numerals denoting corresponding steps.

The multi-function device 1 has stored therein a computer program executed for performing the start-of-reading timing delay processing. FIG. 8 is also a flow chart conceptually illustrating the computer program.

FIGS. 9-15 are schematic views for explaining the duplex reading operation performed in the ADF 4 in the duplex copy mode.

The start-of-reading timing delay processing, which will be described below in greater detail, is performed in the ADF 4 and the image reading unit 24 being stationary, during the duplex reading operation.

However, the start-of-reading timing delay processing is applicable in the scanner 3 (the image reading unit 24 is moved for scanning a stationary document) during a duplex reading operation in a scanner mode.

Figure 9:
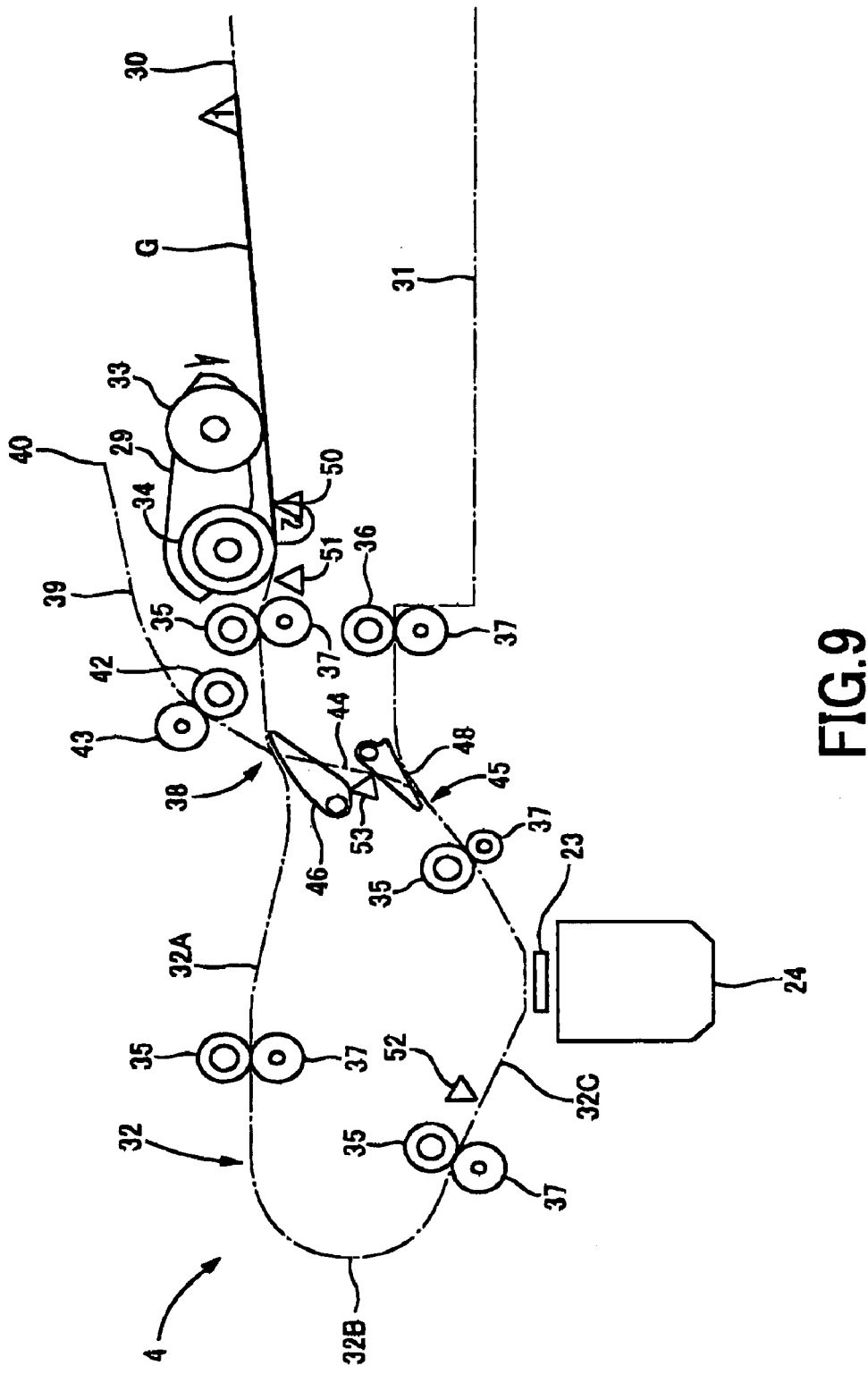
FIG. 9 is a schematic side view for explaining an image reading operation for a duplex mode in the ADF 4.
Figure 10:
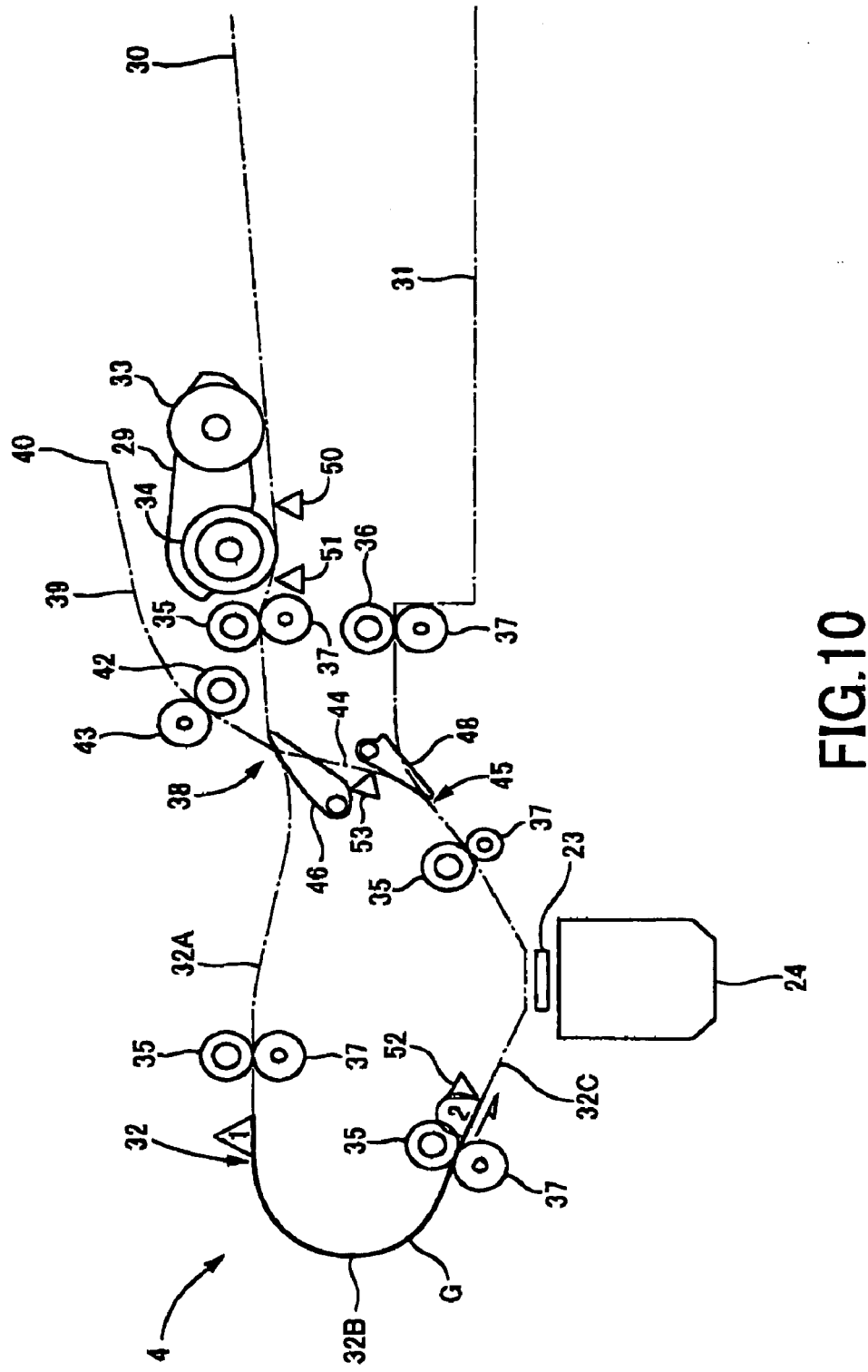
FIG. 10 is another schematic side view for explaining the image reading operation for the duplex mode in the ADF 4.

As illustrated in FIG. 9, prior to supply of a document G from the supply tray 30, the guide flap 46 is situated in the first position, which allows the document G, in an attempt to pass through the junction point 38, to be directed from a supply-tray-side to a scanning position-side of the transport path 32.

It is noted that a side of the document G denoted by "1" in FIG. 9 refers to an obverse face (i.e., the first side), while a side of the document denoted by "2" refers to a reverse face (i.e., the second side). The first side of the document G is to be read first, and the second side of the document G is to be read next. It is of course that the obverse face and the reverse face are opposite to each other.

Step S1

At step S1, the start-of-reading timing delay processing begins to determine whether or not the user entered a duplex-reading command.

The multi-function device 1 is configured such that, once the user depress the copy mode key 16 on the control panel 5, an indication of a duplex copy function is displayed on the liquid-crystal display 11. Upon a user action to the indication, the duplex copy mode is selected.

If the user, after selecting the duplex copy function, depresses the start button 12, then a start signal is generated and sent to the CPU 81. At the instant step, by causing the CPU 81 to determine the presence or absence of the start signal, a determination is made as to whether the duplex reading command is present or absent.

Step S2

If, at step S1, it was determined that the duplex reading command entered, then, at step S2, the document G is picked up from the supply tray 30, and the document G is transported until a leading edge of the document G reaches the scanning position located on the platen glass 23.

More specifically, at first, in response to a command from the CPU 81, the document feed motor (see FIG. 7) is activated, to thereby lower the arm 29 and rotate the pick-up roller 33 and the separator roller 34.

As a result, the document G is fed forward from the supply tray 30 into the transport path 32 (see FIG. 9). At the transport path 32, the feed rollers 35 are rotated to feed the document G from the upstream side to the downstream side of the transport path 32, whereby the document G is fed through the junction point 38 toward the scanning position-side of the transport path 32, with the guide by the guide flap 46.

It is added that, when any document G is not placed on the supply tray 30, the first upstream-side sensor 50 detects a status "no document." In this instance, the CPU 81 sends information indicative of the detected status to a display data memory (not shown), to thereby display a corresponding error message on the liquid-crystal display 11. Concurrently, a copy operation is suspended.

Once the document G, after start of its advancement, reaches somewhere between the junction point 38 and the branching point 45, the guide flap 48 is pivoted by the direction of the CPU 81 to switch routes at the branching point 45, before the leading edge of the document G reaches the branching point 45.

More specifically, it is expected that the trailing end of the document G passes through the junction point 38 after the document feed motor 91 takes a predetermined number of steps since the second upstream-side sensor 51 detected the trailing end of the document G.

This fact enables the CPU 81 to determine whether or not the document G reached somewhere between the junction point 38 and the branching point 45 in the transport path 32, by monitoring the status of a detection signal of the second upstream-side sensor 51, and by measuring a distance by which the feed rollers 35 fed the document G along the transport path 32 (actually, by counting the number of steps taken by the document feed motor 91 since the second upstream-side sensor 51 detected the trailing end of the document G).

After the CPU 81 determined that the document G reached somewhere between the junction point 38 and the branching point 45 in the transport path 32, which is to say, that the number of steps (hereinafter, referred to as "step count") taken by the document feed motor 91 since the second upstream-side sensor 51 detected the trailing end of the document G, the guide flap 48 is pivoted to change the initial route to a second route at the branching point 45 for directing the document G from the scanning position-side of the transport path 32 to the by-pass path 44.

When the document G is further advanced, the document G is fed forward along the curved portion 32B of the transport path 32, such that the curved portion 32B causes the document G to move downwardly and to be inverted (turned upside down). Eventually, the leading edge of the document G is detected by the downstream-side sensor 52 (see FIG. 10). The detection signal of the downstream-side sensor 52 is sent to the CPU 81.

The CPU 81, upon reception of the detection signal from the downstream-side sensor 52, starts counting the number of steps taken by the document feed motor 91. If the CPU 81 counted a predetermined step count T1, then the CPU 81 temporarily stops the transport of the document G. As a result, the document G stops at a position at which the leading edge of the document G is coincident with the scanning position (e.g., in the form of a slit extending in the primary scanning direction) or reading position located on the platen glass 23.

In the present embodiment, the multi-function device 1 is configured to temporarily stop the document G prior to the initiation of each cycle of image reading (i.e., each scan cycle). However, the temporal stoppage of the document G, which is inessential in practicing the present invention, may be replaced with non-stop transport of the document G.

That is to say, in an alternative, while the document G is kept being advanced, a start-of-reading signal is delivered concurrently with achievement of the predetermined step count T1, to the image reading unit 24 for the reading of the document G, eventually resulting in commencement of the reading of the document G by the image reading unit 24.

It is added that, in the present embodiment, the step count T1 is coincident with the number of steps taken by the document feed motor 91 since the downstream-side sensor 52 detected the leading edge of the document G until the same leading edge reaches the scanning position of the image reading unit 24.

The step count T1 is predetermined based on a travel distance between a detection position assigned to the downstream-side sensor 52 and the scanning position, and a feed rate (i.e., a distance by which the document G is advanced per one rotation of each feed roller 35).

In the present embodiment, for the movement of the document G to be monitored, the number of steps taken by the document feed motor 91 is counted. However, in an alternative where, for example, the document G is continuously fed without temporal stoppage at the scanning position, a length of time during transport of the document G may be measured for achieving the same goal.

Step S3: Entry of Duplex Reading Setting Information

As illustrated in FIG. 8, step S3 is implemented, after step S2 is implemented to start the transport of the document G, to perform processing for specifying the duplex reading setting information, and processing for storage of the specified duplex reading setting information into the RAM 83.

Document Type Information

More specifically, the aforementioned document type information of the document G to be read is specified and stored. The document type information means the aforementioned identification information useful to the CPU 81 in identifying the document G as a document bound along its long edge or a document bound along its short edge.

In the present embodiment, the identification information constitutes an example of the "first input information" set forth in the above modes (4) and (6).

For the document type information to enter, titles (items) "DOCUMENT BOUND ALONG LONG EDGE" and "DOCUMENT BOUND ALONG SHORT EDGE" are displayed on the liquid-crystal display 11, after specifying the settings of the duplex copy function. The user is required to select a desired one of these two titles or options, by manipulating the cursor control key 18 and an entry button (not shown) on the control panel 5.

In the present embodiment, for the user to specify a desired document type information, the guidance message including those two options is displayed on the liquid-crystal display 11, and the user is required to select a desired one of the displayed option's.

However, the present invention may be practiced in an arrangement in which two physical user-operable keys are disposed at the control panel 5 which allow the user to specify a desired one of "DOCUMENT BOUND ALONG LONG EDGE" and "DOCUMENT BOUND ALONG SHORT EDGE" for entry of the desired document type information.

Output Image Resolution and Number of Output Lines

At step S3, in addition to the above, the settings for an output image resolution, the number of output lines, etc. are specified and stored. These sets of information are entered by the user through the control panel 5, in a similar manner with the identification information of the document G described above.

Read Range Designation Information (Optional)

In the case where the multi-function device 1 combines a function of allowing the user to variously designate a read range of the image reading unit 24 as desired, step S3 is further implemented to specify and store read-range designation information indicative of the read range instructed by the user through the control panel 5.

Enlargement/Reduction Ratio

Step S3 is further implemented to specify an enlargement/reduction ratio of the document G. The multi-function device 1 is configured to display, when the copy mode has been selected, a current value of the enlargement/reduction ratio (its default value is 100%), on the liquid-crystal display 11. At this time, if the user depresses the enlargement/reduction setting button 20 disposed on the control panel 5, then the current value of the enlargement/reduction ratio is reverse-displayed for highlighting.

During this state, the user can enter a desired enlargement ratio or otherwise a desired reduction ratio, by manipulating the ten-key pad 17 and the aforementioned entry button (not shown). Upon entry of the current enlargement/reduction ratio, the entered enlargement/reduction ratio is stored in the RAM 83 as a set value.

If no enlargement/reduction ratio was entered, then a predetermined default value (i.e., 100%) is used as the set value.

It is added that, it is of course that the aforementioned output image resolution, the aforementioned number of output lines, the aforementioned document type information, etc. may be given respective default values.

In the present embodiment, the output image resolution, the number of output lines, the read-range designation information and the enlargement/reduction ratio each constitute an example of the "related information" set forth in the above mode (7).

As will be evident from the above, in the present embodiment, the duplex reading setting information is defined to include:

the document type information;
the output image resolution;
the number of output lines;
the read-range designation information (optional); and
the enlargement/reduction ratio.

As described above, the multi-function device 1 is configured to incorporate as an image enlargement/reduction function, the function of reducing or enlarging an image read by the scanner 3, by increasing or decreasing a scan rate of the image reading unit 24 (i.e., a speed of the image reading unit 24 moving in the secondary scan direction), relative to the default scan rate, for reducing or increasing the amount of data indicative of the image which has been read by the scanner 3.

Therefore, enlargement of the image on the document G requires a reduction in the scan rate of the image reading unit 24, resulting in a greatly increased amount of information created by the image reading unit 24. In this regard, the scan rate may mean the moving speed of the image reading unit 24 or the moving speed of the document G.

In addition, in a conventional system, during each scan for reading an entire image on a document sheet (i.e., a pre-recorded sheet) of interest, a partial scanned-image (e.g., a line image) is obtained by an image reader per each scan line at each scan position in the secondary scan direction, and the a set of a plurality of partial images obtained totally per each scan cycle represents the entire image on the document sheet.

In such a conventional system, where the system incorporates the aforementioned type of enlargement/reduction function, it is common that the size of a set of a plurality of partial scanned-images obtained since a start-of-reading up to a current scan line is detected, and if the detected size becomes coincident with the size of the current document sheet or the size of a print sheet on which the image is to be printed, then the current scan cycle for a reading operation is abruptly terminated or aborted.

In the present embodiment, at the time that a current set of a plurality of partial scanned-images produced by the image reading unit 24 becomes equal in size to a document sheet to be read, the current reading operation is abruptly terminated or aborted.

Therefore, in the present embodiment, a maximum read range is set, based on various sets of information entered at step S3, such that, when an image is to be enlarged (i.e., the entered enlargement/reduction ratio is above 100%), a secondary-scan-path-length (i.e., a longitudinal length of the read range) is set to be shorter, and when an image is to be reduced (i.e., the entered enlargement/reduction ratio is below 100%), the secondary-scan-path-length is set to be longer.

It is of course that the secondary-scan-path-length is set based on not only the enlargement/reduction ratio but also the output image resolution, the number of output lines, etc., in a manner well known in the art.

It is added that the midway termination of reading operation is not always essential, the multi-function device 1 may be modified to read an entire image on a document sheet, irrespective of the magnitude of the entered enlargement/reduction ratio.

In the present embodiment, if the maximum read range has its secondary-scan-path-length longer than that of the user-specified read range described above, then the maximum read range is determined as an effective read range. In contrast, if the maximum read range has its secondary-scan-path-length not longer than that of the user-specified read range described above, then the user-specified read range is determined as an effective read range.

Step S4

Upon completion of step S3, step S4 is implemented to calculate the secondary-scan-path-length in a manner described above. The calculated value is stored in the RAM 83. In this regard, the secondary-scan-path-length is defined to mean the length of the read range as viewed in the secondary scan direction, which length is obtained based on the duplex reading setting information specified at step S3.

At step S4, there is determined based on the duplex reading setting information the read range over which the image reading unit 24 is to read on a current document sheet, and the secondary-scan-path-length is calculated from the determined read range.

More specifically, for example, if "DOCUMENT BOUND ALONG LONG EDGE" was selected at step S3, the enlargement/reduction ratio was set to 141% at step S3, and the remaining parameters were set equal to their respective default values at step S3, then the secondary-scan-path-length is calculated equal to the length of the long edge of an A3-sized document sheet (i.e., 1.41 times as large as an A4-sized document sheet), namely, 420 mm, at step S4.

It is of course that this value of the secondary-scan-path-length is merely exemplary, and the secondary-scan-path-length can take various values according to the sets of information specified at step S3.

Step S5

Upon the secondary-scan-path-length being calculated, step S5 is implemented to set a delay time T2 to "0." The delay time T2 is defined to mean a delay time of a start-of-reading timing with which the image reading unit 24 is to start an image reading operation for the obverse face (i.e., the first side) of a current document G.

The current value of the delay time T2 is stored in a predetermined memory area in the RAM 83, a register in the CPU 81, etc. The CPU 81 accesses the delay time T2 from the associated storage area, and determines a start-of-reading position on the document G by reference to the delay time T2.

It is added that the delay time T2 of the start-of-reading timing is defined in terms of the number of steps taken by the document feed motor 91. More specifically, the number of steps means the number of steps taken by the document feed motor 91 since the leading edge of the document G reached the scanning position located on the platen glass 23.

Step S6

Upon completion of step S5, step S6 is implemented to start reading the image on the obverse face of the document G at its leading edge. As described above, the delay time T2 of the start-of-reading timing was set to "0" at step S5, and therefore, at step S6, the image reading operation starts at the leading edge of the document G, without delay of the start-of-reading timing.

That is to say, the start-of-reading timing without delay means the original or normal start-of-reading timing at which the leading edge of the document G is positioned exactly at the scanning position located on the platen glass 23. Therefore, the delay time T2 is equal to a time difference between the normal start-of-reading timing and the actual start-of-reading timing.

At step S6, more specifically, the CPU 81 activates the document feed motor 91 to thereby re-start feeding the document G, and generates the start-of-reading signal. In response to receiving the start-of-reading signal, the image reading unit 24 starts an image reading operation for the obverse face of the current document G.

Step S6 is further implemented to perform, in parallel to the image reading operation, a length detecting operation for detecting the length of the document G in the secondary scan direction.

The length of the document G in the secondary scan direction is detected based on the number of steps taken by the document feed motor 91 since the current reading operation started at the leading edge of the document G until the current reading operation terminates at the trailing end of the document G.

Therefore, the initiation of the length detecting operation means the initiation of the counting the number of steps taken by the document feed motor 91 since the current reading operation started at the leading edge of the document G. The count value is stored in the RAM 83.

It is added that the length detecting operation of the length of the document G in the secondary scan direction is not exclusive, and may be performed, for example, such that the number of steps taken by the document feed motor 91 since the downstream-side sensor 52 detected the leading edge of the document G until the downstream-side sensor 52 detects the trailing end of the document G is counted, and such that, if necessary, the count value is converted into a travel distance by which the document G traveled.

Step S7

Step S7 is subsequently implemented to make a first determination as to whether or not the image on the document G was read over the secondary-scan-path-length (see step S4), and a second determination as to whether the trailing end of the document G passed through the scanning position of the image reading unit 24.

In this regard, the first determination is made by determining whether or not the document G was fed by the secondary-scan-path-length by reference to the number of steps taken by the document feed motor 91.

On the other hand, the second determination is made by determining whether or not the number of steps taken by the document feed motor 91 since the downstream-side sensor 52 detected the trailing end of the document G during the image on the obverse face of the document G was read, became coincident with the same step count as the step count T1.

At step S7, if the first determination resulted in a first conclusion that the image on the document G was read over the secondary-scan-path-length, then the second determination terminates.

On the other, if the second determination resulted in a second conclusion that the trailing end of the document G passed through the scanning position of the image reading unit 24, then the first determination terminates.

Step S8

Upon one of the first and second conclusions resulting, step S8 is implemented to terminate the reading operation for the obverse face of the document G by the image reading unit 24.

More specifically, the CPU 81 generates a terminate signal which is in turn sent to the image reading unit 24. As a result, concurrently with the passing of the trailing end of the document G through the scanning position or the completion of reading the images on the document G over the secondary-scan-path-length, the image reading unit 24 terminates the image reading operation for the obverse face of the document G.

Step S9

If, at step S7, the first conclusion (i.e., the image on the document G was read over the secondary-scan-path-length) was made prior to the second conclusion (i.e., the trailing end of the document G passed through the scanning position), then the length detecting operation of the length of the document G in the secondary scan direction (see step S6) continues.

More specifically, the length detecting operation continues until the trailing end of the document G is detected at step S9.

At step S9, if the trailing end of the document G was detected, the CPU 81 proceeds to step S10.

If, however, at step S7, the second conclusion (i.e., the trailing end of the document G passed through the scanning position) was made prior to the first conclusion (i.e., the image on the document G was read over the secondary-scan-path-length), then the CPU 81 skips steps S8 and S9 to proceed step S10.

Step S10

At step S10, a terminating operation is performed to terminate the length detecting operation of the length of the document G in the secondary scan direction, provided that the trailing end of the document G was detected.

More specifically, the CPU 81 terminates the counting of the number of steps taken by the document feed motor 91. The CPU 81 accesses the count value from the RAM 83, and calculates the length of the document G in the secondary scan direction based on the count value. At step S10, the length of the document G in the secondary scan direction calculated in that manner is stored in the RAM 83.

Upon calculation of the length of the document G in the secondary scan direction, the CPU 81 identifies the size of the document G from the calculated length.

In the present embodiment, in which a maximum size of a readable document sheet that the scanner 3 can accommodate is A4-sized (when fed in portrait or vertical orientation), if the calculated length of the document G in the secondary scan direction is equal to 297 mm, then the CPU 81 identifies the size of the document G as an A4 size. In addition, if the calculated length is equal to 257 mm, then the CPU 81 identifies the size of the document G as a B5 size.

Provided that the document G is placed on the supply tray 30 in portrait or vertical orientation, if the calculated length of the document G in the secondary scan direction is equal to 210 mm, then the CPU 81 identifies the size of the document G as an A5 size.

For the CPU 81 to successfully perform the above-described size identifying operation for identifying the size of the document G, the ROM 82 or the EEPROM 84 has previously stored therein information of the standardized paper sheet sizes.

As described above, for the convenience of describing the flow chart of FIG. 8, it is assumed that the size of the document G is an A4 size. Therefore, the size identifying operation is originally not necessary to be performed.

However, if the size of the document G has not been identified, then the size identifying operation is effectively performed.

Figure 11:
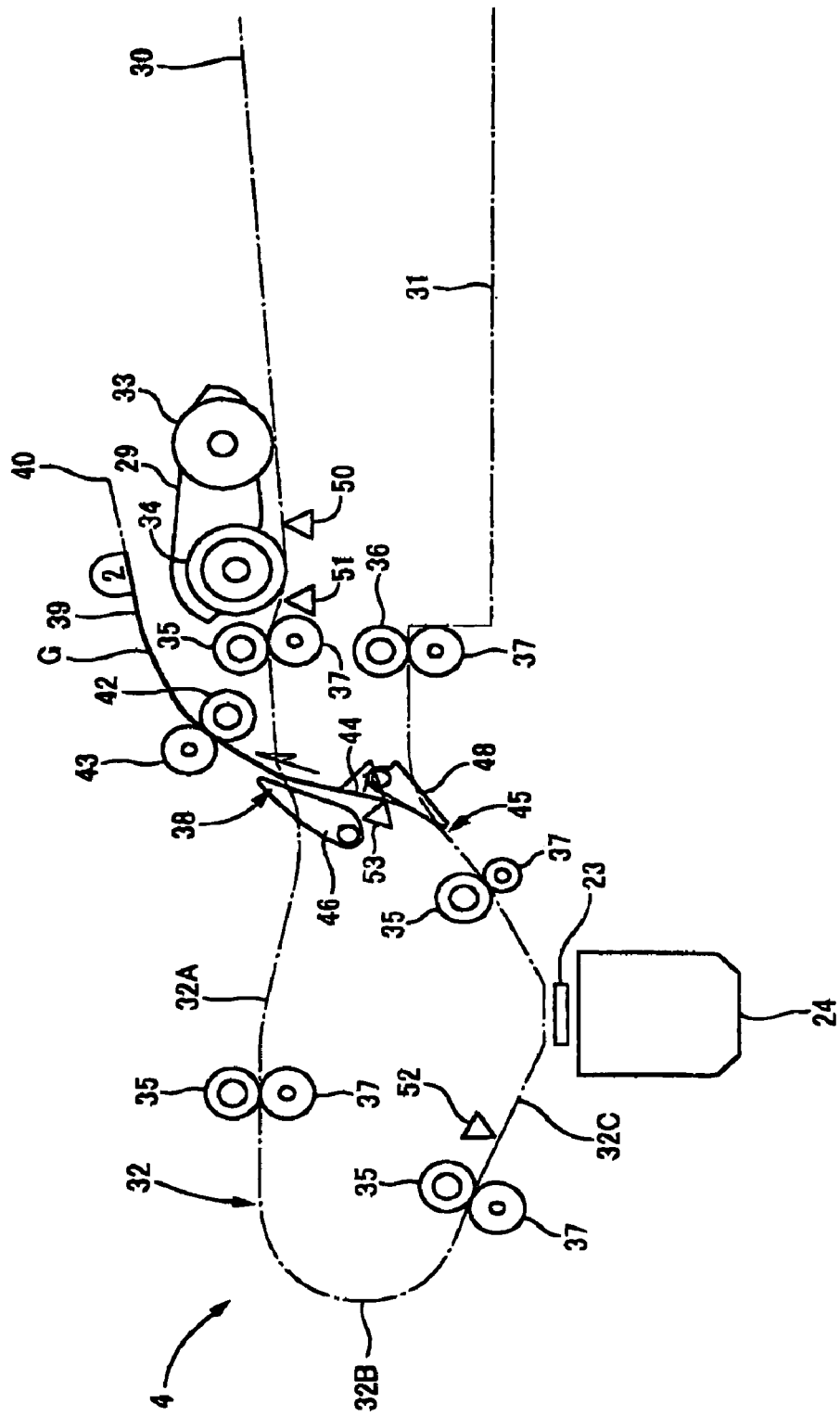
FIG. 11 is still another schematic side view for explaining the image reading operation for the duplex mode in the ADF 4.

As illustrated in FIG. 11, upon completion of the image reading unit 24 reading the image on the obverse face of the document G, the document G is directed by the guide flap 48 from the transport path 32 to the by-pass path 44 through the branching point 45.

The document G, upon entry into the by-pass path 44, is brought into abutting engagement with the guide flap 46, to thereby push the guide flap 46 to pivot upwardly, resulting in advancement of the document 5 from the by-pass path 44 into the by-directional path 39 through the junction point 38.

That is to say, the guide flap 46 is adapted to guide the document G to allow the document G to advance straight from the by-pass path 44 to the bi-directional path 39 through the junction point 38.

The by-pass path 44 and the bi-directional path 39 are arranged to form a substantially straight single line, allowing the document G to desirably advance straight to enter the bi-directional path 39, without undesirable advancement to the supply-tray side of the transport path 32 through the junction point 38.

Eventually, the document G is brought into a nip zone formed between the bi-directional path roller 42 and the pinch roller 43, and, because of the rotation of the bi-directional path roller 42, is fed toward the exit 40 of the bi-directional path 39.

Upon complete entry of the document G into the bi-directional path 39, the bi-directional path roller 42 is deactivated.

Figure 12:
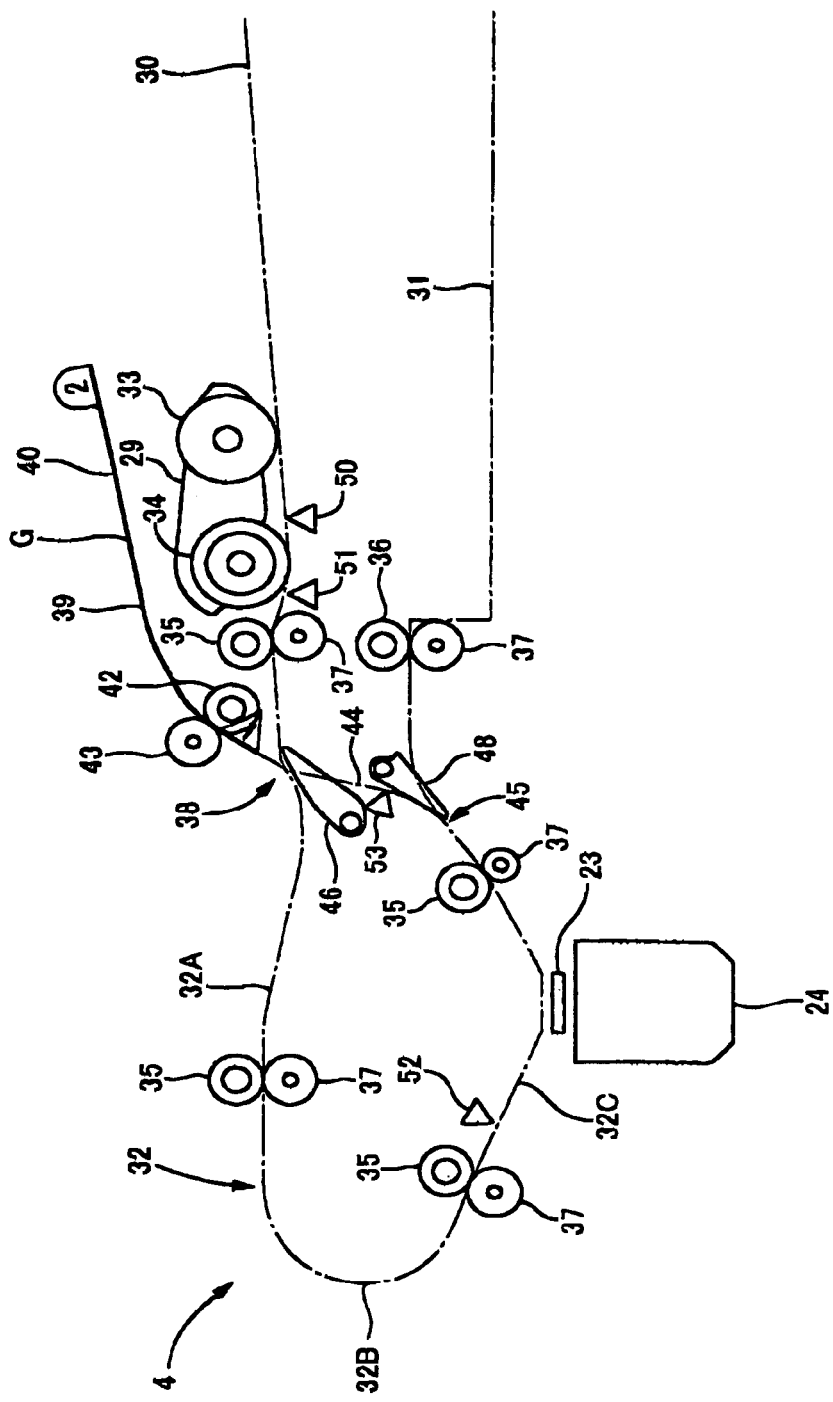
FIG. 12 is yet another schematic side view for explaining the image reading operation for the duplex mode in the ADF 4.

More specifically, as illustrated in FIG. 12, the document G is stopped with its trailing end being nipped by and between the bi-directional path roller 42 and the pinch roller 43. During this state, the document G is held with its part projecting from the exit 40 of the bi-directional path 39 toward the outside of the ADF 4.

In addition, once the document G passes through the junction point 38 and becomes apart from the guide flap 46, the guide flap 46 pivots downwardly into a position (returns to its original position due to a return spring and/or gravity) allowing the document G to travel from the bi-directional path 39 to the upstream side of the scanning position within the transport path 32, at the junction point 38.

Figure 13:
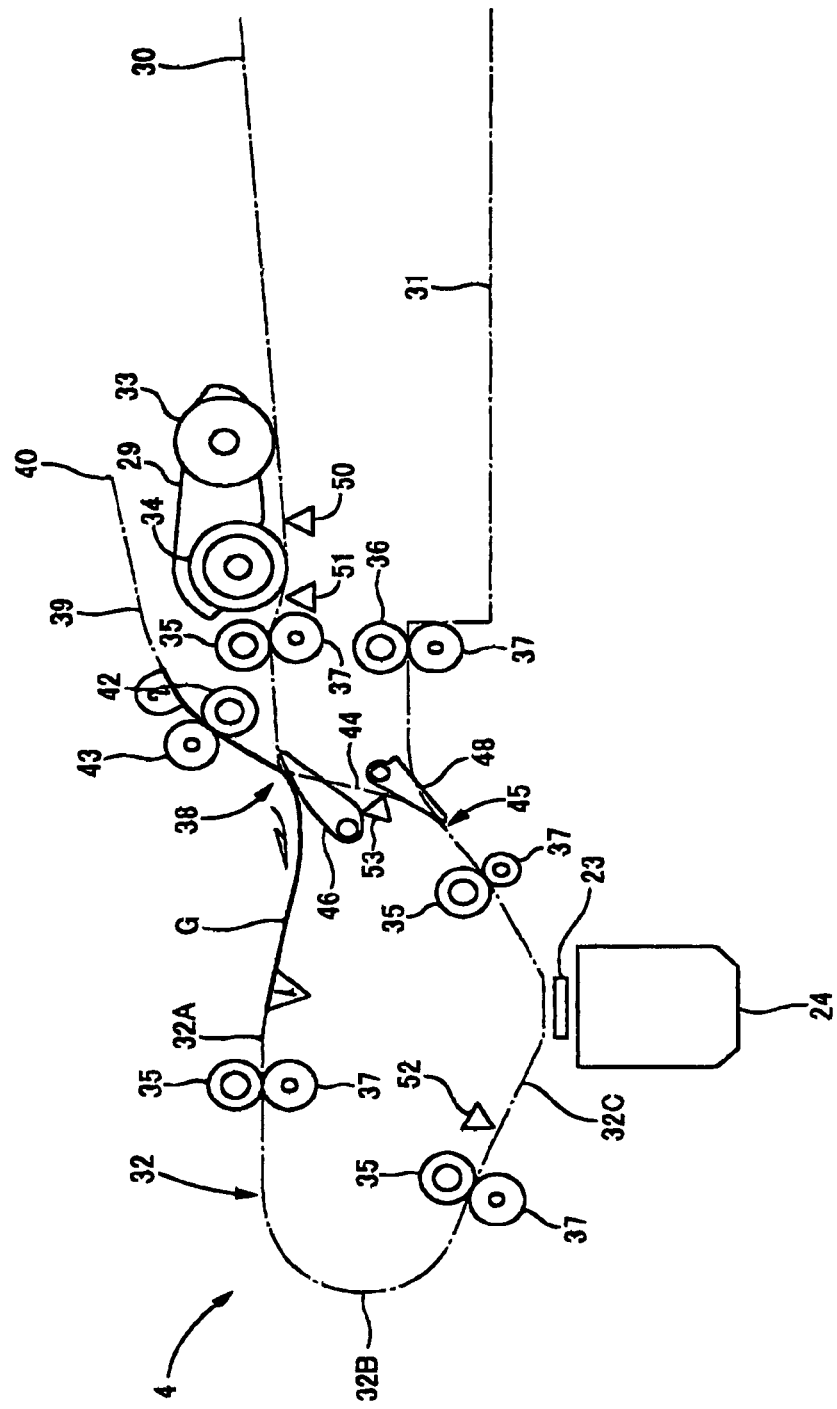
FIG. 13 is an additional schematic side view for explaining the image reading operation for the duplex mode in the ADF 4.

Thereafter, as illustrated in FIG. 13, the bi-direction path roller 42 is re-activated in a reverse rotation direction, causing the document G to start advancing along the bi-directional path 39 toward the transport path 32.

The document G, upon starting advancing along the bi-directional path 39 toward the transport path 32, is directed by the guide flap 46 from the bi-directional path 39 to the upstream side of the scanning position within the transport path 32.

The bi-directional path 39 and the transport path 32 are arranged, such that the bi-directional path 39 and the supply-tray-side of the transport path 32 are interconnected more acutely than the bi-directional path 39 and the upstream side of the scanning position within the transport path 32 are interconnected.

As a result, the document G, upon starting advancing along the bi-directional path 39 toward the transport path 32, is prevented from unexpectedly advancing toward the supply-tray-side of the transport path 32 through the junction point 38.

The document G, because of the advancement from the bi-directional path 39 to the transport path 32 in that manner enables the document G to be re-fed along the transport path 32, after the original trailing end of the document G changes to the current leading edge of the document G.

Thus, a transport direction in which the document G is transported is reversed with respect to its original transport direction. Subsequently, the document G is transported along the transport path 32, with the revere side (i.e., the second face side) of the document G facing the scanning position.

Step S11

Figure 14:
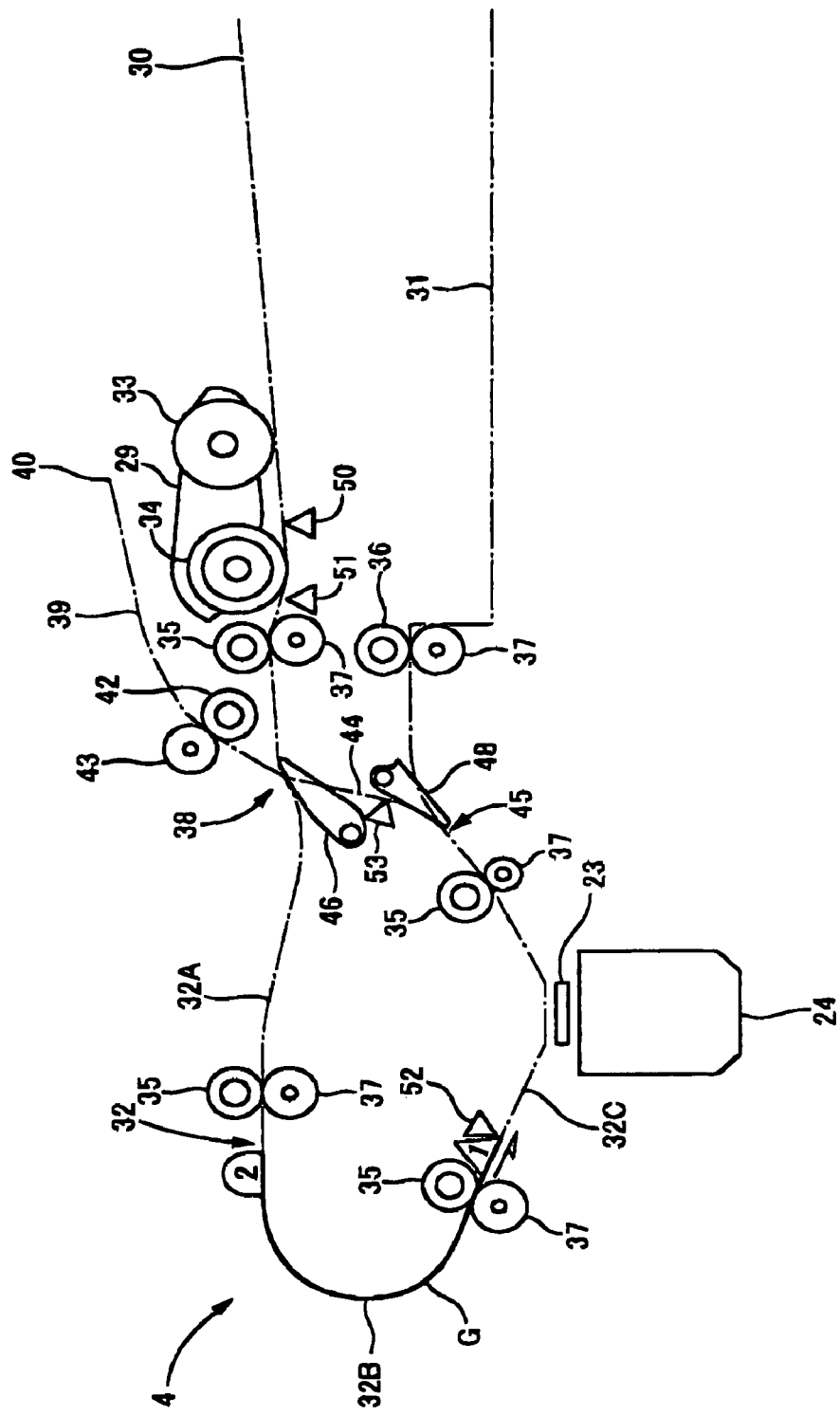
FIG. 14 is still additional schematic side view for explaining the image reading operation for the duplex mode in the ADF 4.

As illustrated in FIG. 14, upon the document G being further advanced, step S11 is implemented to cause the downstream-side sensor 52 to detect a leading edge of the document G.

At step S11, predetermined processing similar with step S2 is further implemented, to thereby feed the document G until its leading edge reaches the scanning position located on the platen glass 23.

Step S12

At step S12, a determination is made as to whether or not the document G is a DOCUMENT BOUND ALONG LONG EDGE. More specifically, the CPU 81 accesses setting information including the aforementioned document type information from the RAM 83, and makes the determination based on the accessed setting information.

In this regard, the DOCUMENT BOUND ALONG LONG EDGE is a document in which its long edges and the extension or elongation direction of a binding edge assigned to the document are in parallel to each other.

As described above, it is assumed, in the present embodiment, that the document G is inevitably fed in vertical orientation. In addition, the document G fed in vertical orientation is a document fed with the direction of the long edges and the transport direction being in parallel to each other.

Therefore, the processing performed at step S12 to determine whether or not the document G is a DOCUMENT BOUND ALONG LONG EDGE, provided that the document G is inevitably fed in vertical orientation is equivalent to a determination as to whether or not the extension direction of the binding edge of the document G and the transport direction of the document G are both in parallel to the direction of the long edges of the document G.

Step S15

If, at step S12, the CPU 81 determined that the document G was not a DOCUMENT BOUND ALONG LONG EDGE but a DOCUMENT BOUND ALONG SHORT EDGE, then the CPU 81 proceeds to step S15.

At step S15, the CPU 81, similarly with step S5, sets the delay time T2 of the start-of-reading timing with which the image reading unit 24 is to read the image on the reverse face of the document G, to "0," and the CPU 81 proceeds to step S18 described below. FIGS. 16(a) and 16(b) illustrate the document G, which is a DOCUMENT BOUND ALONG LONG EDGE, and which is to be fed in vertical orientation. FIG. 16(a) further illustrates that the delay time T2 is "0" for reading the obverse face of the document G, while FIG. 16(b) further illustrates that the delay time T2 is not "0" for reading the reverse face of the document G.

It is added that FIG. 16(a) illustrates the first side (i.e., the obverse side) of the document G on which an image of "ABC" is drawn along one of the short edges, while FIG. 16(b) illustrates the second side (i.e., the reverse side) of the document G on which an image of "abc" is drawn along one of the short edges.

For the document G of DOCUMENT BOUND ALONG LONG EDGE, an image is pre-recorded on the first side of the document G, using as a reference for image disposition, one of the opposite long edges which the document G is to be bound for filing, while an image is pre-recorded on the second side of the document G, using as a reference for image disposition, one of the opposite long edges which the document G is not to be bound for filing.

For clarification, in FIGS. 16(a) and 16(b), the white arrows indicate the directions in which the opposite sides of the document G are read. Further, a top edge of the document G when viewed in a direction to allow an image formed on each side of the document G to erect is colored black to form a black-colored band.

Step S13

Upon entry into step S13, the CPU 81 compares the secondary-scan-path-length calculated at step S4 and the length of the document G in the secondary scan direction detected at step S10 to each other. The CPU 81 determines whether the secondary-scan-path-length is larger or smaller than the length of the document G in the secondary scan direction.

If, at step S13, the CPU 81 determined that the secondary-scan-path-length was larger, then the CPU 81 proceeds to step 15 to set the delay time T2 of the start-of-reading timing for reading the reverse face of the document G to "0." Thereafter, the CPU 81 proceeds to step S18 described below.

Step S14

If, however, at step S13, the CPU 81 determined that the secondary-scan-path-length was smaller, then the CPU proceeds to step S14.

At step S14, the CPU 81 calculates the delay time T2 of the start-of-reading timing for reading the image on the reverse face of the document G, in a manner described below.

It is added that, as described above, the present embodiment is configured to provide the aforementioned function of abruptly terminating the reading operation when the size of the scanned image exceeds the limit.

Under this circumstance, step S14 is implemented when the secondary-scan-path-length is smaller than the length of the document G in the secondary scan direction.

However, the present invention may be practiced in an arrangement in which, in the absence of the above-mentioned function, step S14 is implemented when the secondary-scan-path-length is larger than the length of the document G in the secondary scan direction.

At step S14, as described above, the CPU 81 calculates the delay time T2 of the start-of-reading timing for reading the image on the reverse face of the document G.

In this regard, the delay time T2 of the start-of-reading timing is defined in terms of the number of steps (hereinafter, referred to as "step count") taken by the document feed motor 91 since the leading edge of the document G reached the scanning position located on the platen glass 23 until the leading edge of the document G reaches a start-of-reading position at which the image reading is to start on the reverse face of the document G.

By definition,

A: the length of the document G in the secondary scan direction detected at step S10 (in terms of the step count);

B: the secondary-scan-path-length calculated at step S4 (in terms of the step count);

C: the output image resolution set at step S3 (dpi)

D: the enlargement/reduction ratio set at step S3 (%); and

E: the number of output lines set at step S3.

The delay time T2 is calculated using the following equation, provided that a maximum value of the output image resolution of the scanner 3 in the multi-function device 1 is 4,800 dpi:

$$T2 = A - B = A - E \cdot (100/D) \cdot (4800/C).$$

As will be evident from the above equation, the delay time T2 of the start-of-reading timing for reading the image on the opposite face of the document G is calculated based on the difference between the length of the document G in the secondary scan direction and the secondary-scan-path-length calculated at step S3.

In the present embodiment, the length of the document G in the secondary scan direction corresponds to the "size of the document" set forth in the above mode (8), and the secondary-scan-path-length corresponds to the "size of the read range" set forth in the same mode.

Step S16

The CPU 81, after calculation the delay time T2 of the start-of-reading timing at step S14, implements step S16 to re-start the transport of the document G which has been stopped, as a result of the implementation of step S11, at a position allowing the leading edge of the document G to be coincident with the scanning position on the platen glass 23.

In this instance, because of the delay time T2 not being "0," the reading operation for the image on the opposite face of the document G does not start concurrently.

Step S17

Upon start of the re-feed of the document G, the CPU 81 implements step S17 to monitor the number of steps taken by the document feed motor 91 since the re-feed of the document G started, and determines whether or not the count value reached the delay time T2 calculated at step S14. If the CPU 81 determined that the count value reached the delay time T2, then the CPU 81 proceeds to step S18.

Step S18

Upon entry into step S18, the CPU 81 generates a start-of-reading signal. In response to the start-of-reading signal from the CPU 81, the image reading unit 24 starts reading the image on the reverse face of the document G.

Where step S18 is implemented after steps S12-14 are implemented, the reading operation starts on the image on the reverse face of the document G at a position spaced apart from the leading edge of the reverse face by a distance corresponding to the delay time T2 (=A–B).

In contrast, where step S18 is implemented after step S15 is implemented, the reading operation starts on the image on the reverse face of the document G at the leading edge of the reverse face.

Steps S19 and S20

After start of the image reading, the CPU 81 implements steps S19 and S20 to perform processing similar with that of steps S7 and S8, for the reading operation of the image on the reverse face of the document G.

Step S21

At step S21, the document G is delivered to the exit tray 31. The document delivery will be described below with its more specific motions in greater detail.

The document G, upon completing reading the image on the second side of the document G, is directed by the guide flap 48 from the transport path 32 to the by-pass path 44 through the branching point 45.

The document G, upon re-entry into the by-pass path 44, is brought into abutting engagement with the guide flap 46, to thereby push the guide flap 46 to pivot upwardly, resulting in advancement of the document G from the by-pass path 44 into the by-directional path 39 through the junction point 38. Upon complete entry of the document G into the bi-directional path 39, the bi-directional path roller 42 is deactivated.

The guide flap 46, upon complete passing of the document G through the guide flap 46, returns to the original position allowing the document G to travel from the bi-directional path 39 to the scanning position-side of the transport path 32.

Subsequently, the bi-directional path roller 42 is re-activated to rotate in a reverse direction, causing the document G to advance from the bi-directional path 39 to the transport path 32, with the result that the original trailing end is changed to the current leading edge of the document G. That is to say, the transport direction of the document G is reversed again.

Once the documents G reaches somewhere between the junction point 38 and the branching point 45 within the transport path 32, the guide flap 48 switches travel routes at the branching point 45 for directing the document G from the scanning position-side of the transport path 32 to the exit tray 31.

Figure 15:
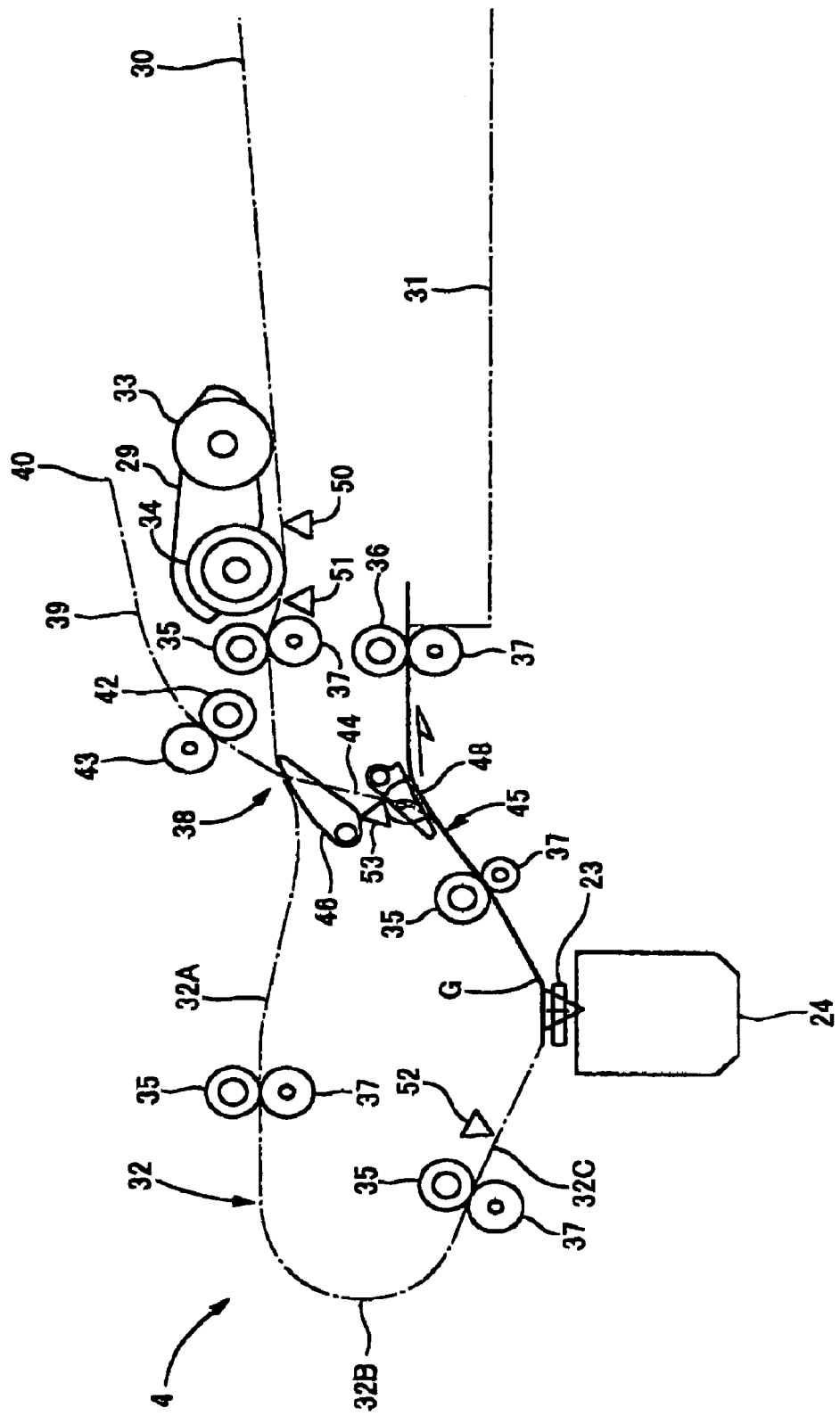
FIG. 15 is yet additional schematic side view for explaining the image reading operation for the duplex mode in the ADF 4.

As a result, as illustrated in FIG. 15, the document G is directed by the guide flap 48 toward the exit-tray-side of the transport path 32 through the branching point 45, whereby the document G is delivered to the exit tray 31 with the first side (i.e., the obverse face) facing downwardly.

Step S22

After delivery of the document G to the exit tray 31, the CPU 81 implements step S22 to determine whether the next document to be read has been placed on the supply tray 30.

If the CPU 81 found the presence of the next document on the supply tray 30, then the CPU 81 performs a series of the steps beginning with step S1 for the next document.

If, however, the CPU 81 did not find the next document, then the CPU 81 terminates one cycle of the image reading processing.

Figure 16:
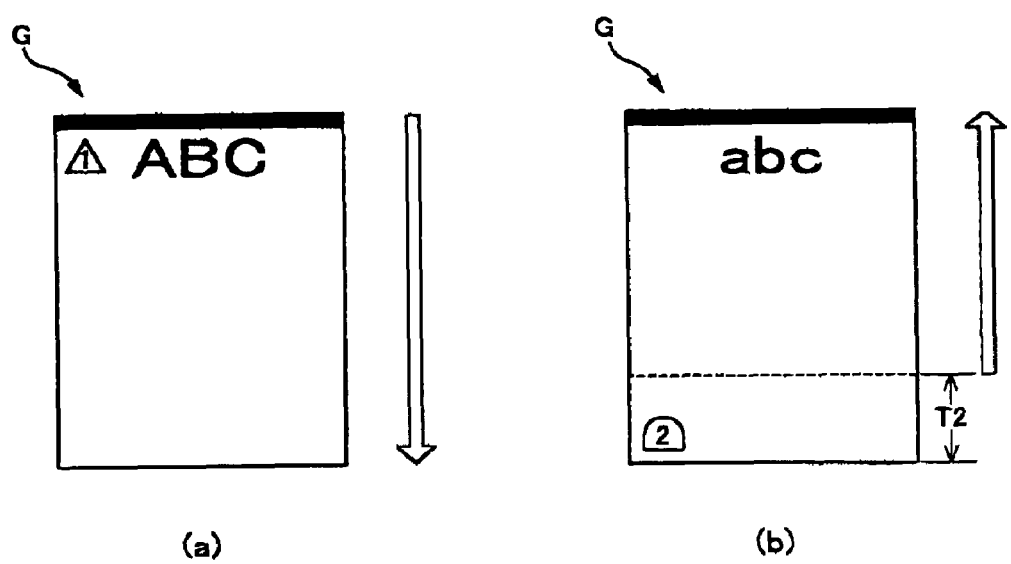
FIG. 16(a) is a top plan view illustrating how a first side of a document G which is transported in portrait orientation and which will be bound along its long edge is read.
FIG. 16(b) is a top plan-view illustrating how a second side of the document G is read with a delay time T2, according to the first embodiment of the present invention.

As will be evident from the foregoing, the multi-function device 1 is configured, not such that a delay time of the start-of-reading timing is fixed, but such that, given that the document type of the document G is specified, when the document G is fed in vertical orientation (see FIG. 22), and when the document G is to be bound along its one long edge (see FIG. 16), the start-of-reading timing with which the image reading operation starts on the second side of the document G is delayed.

Where the start-of-reading timing is delayed, the image reading operation starts on the second side of the document G at a position spaced apart from the leading edge of the second side, by a distance corresponding to the delay time T2, as illustrated in FIG. 16.

As will be evident from the foregoing, the multi-function device 1 is configured, such that, when the document G is fed in vertical orientation, and when the document G is to be bound along its one short edge, the start-of-reading timing with which the image reading operation starts on the second side of the document G is not delayed.

Therefore, a failure to read the image on the second side is avoided from occurring.

SECOND EMBODIMENT

Next, a second embodiment of the present invention will be described with reference to FIGS. 17 and 18.

Because the present embodiment is different from the first embodiment, only with respect to the software configuration, and is common to the first embodiment with respect to other elements, the common elements will be omitted in detailed description by reference using the identical reference numerals or names, while only the different elements will be described in greater detail below.

In the first embodiment, the flow chart of FIG. 8 is executed only when the document G is to be fed in vertical orientation.

Figure 17:
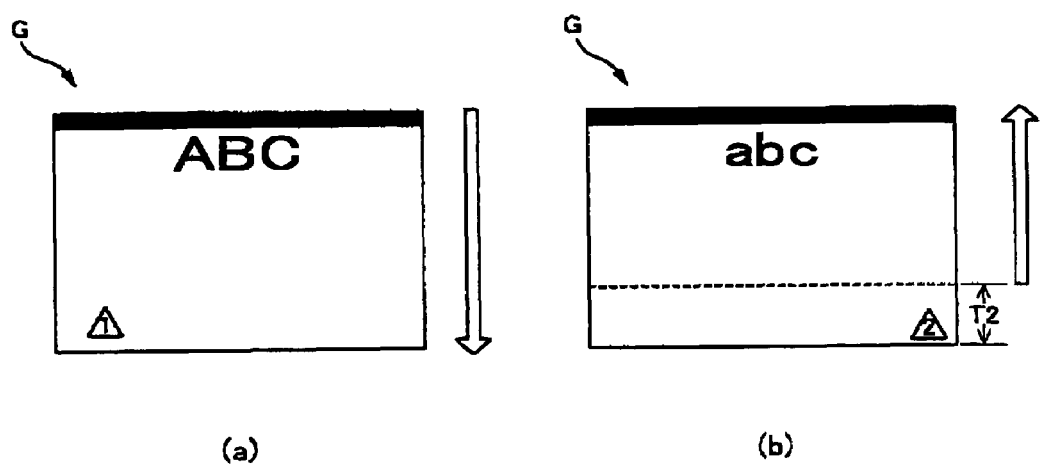
FIG. 17(a) is a top plan view illustrating how a first side of a document G which is transported in landscape orientation and which will be bound along its short edge is read.
FIG. 17(b) is a top plan view illustrating how a second side of the document G is read with a delay time T2, according to a second embodiment of the present invention.
Figure 18:
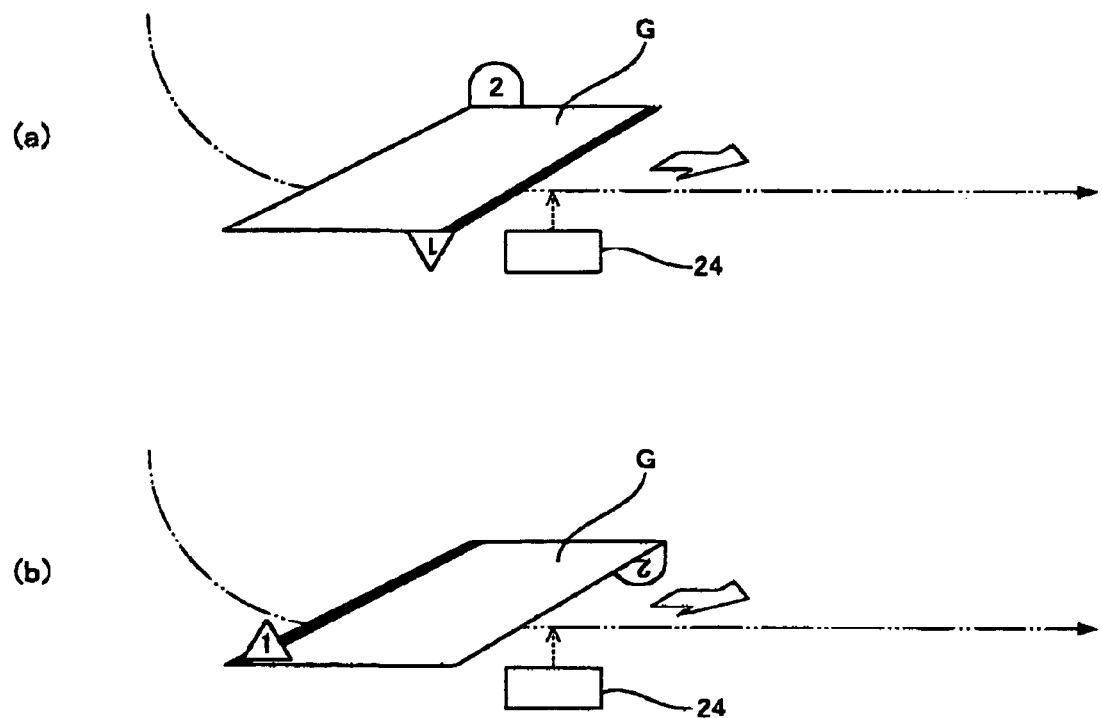
FIG. 18(a) is a perspective view illustrating how a first side of a document G which is transported in landscape orientation is read.
FIG. 18(b) is a perspective view illustrating how a second side of the document G is read, according to the second embodiment of the present invention.
Figure 19:
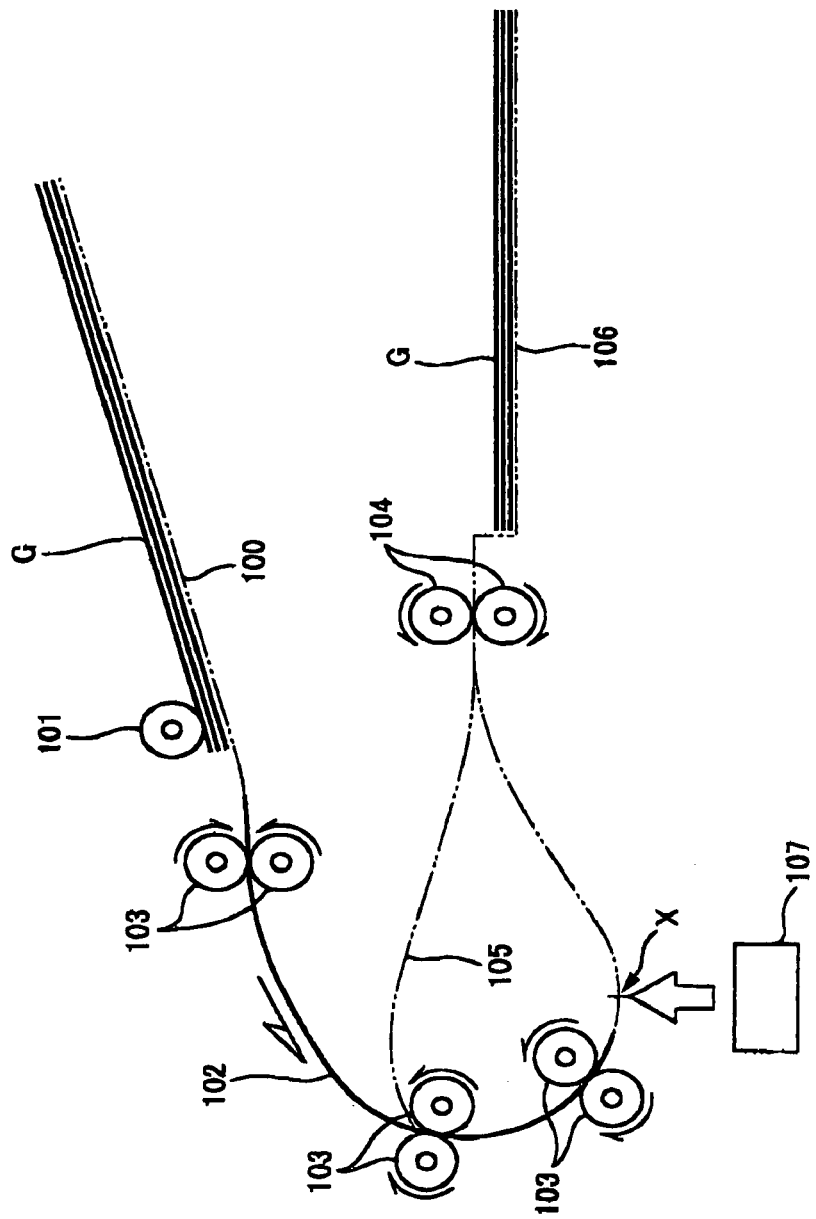
FIG. 19 is a schematic side view illustrating a document travel path in a conventional image reading apparatus incorporating an ADF capable of duplex reading.
Figure 20:
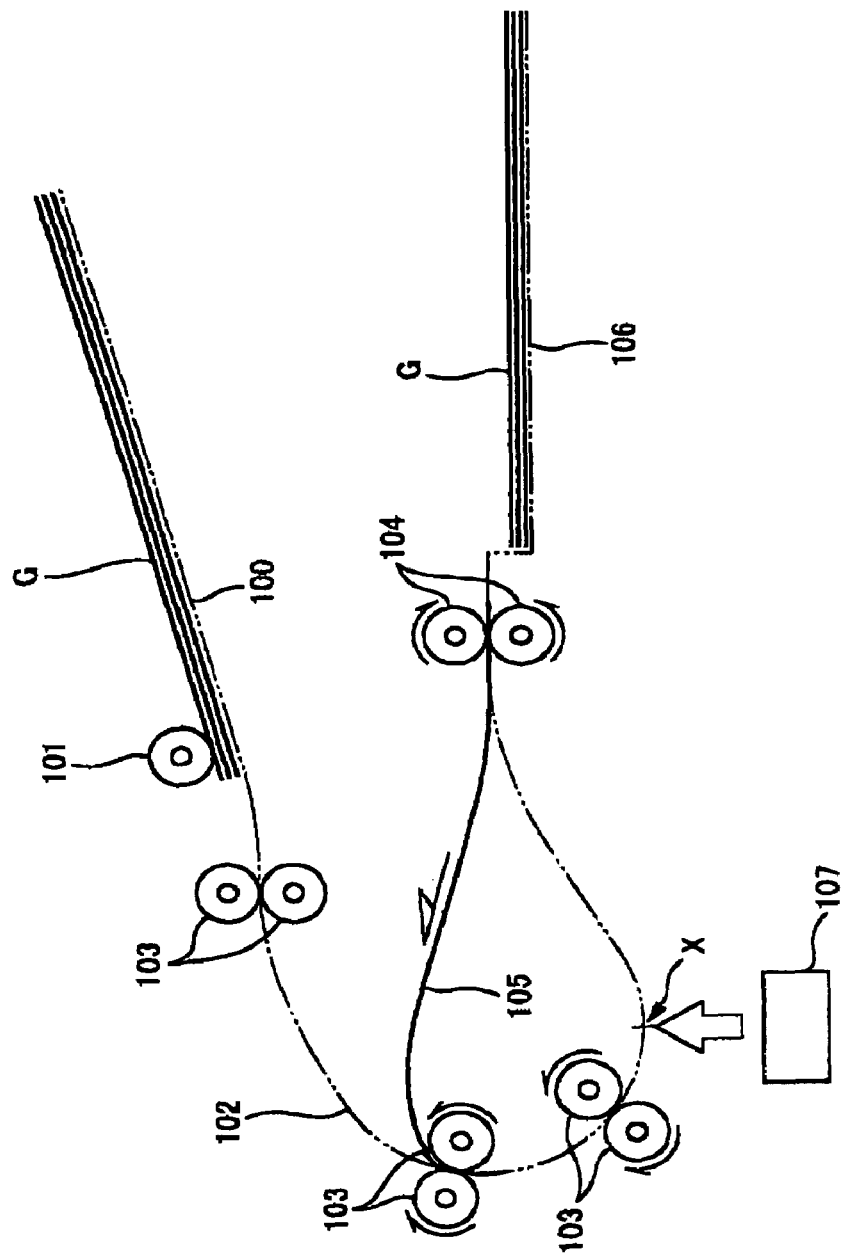
FIG. 20 is another schematic side view illustrating the document travel path depicted in FIG. 19.
Figure 21:
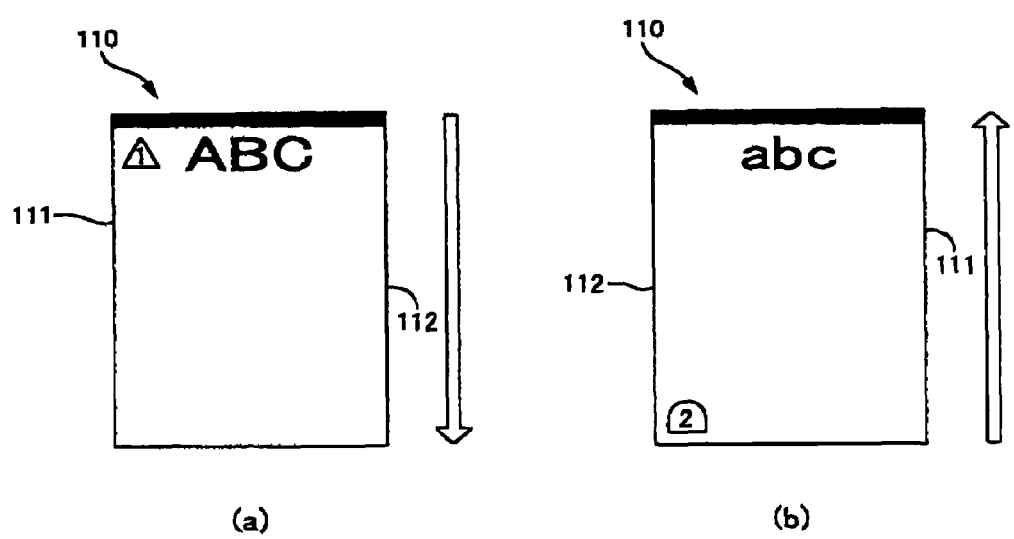
FIG. 21(a) is a top plan view illustrating how a first side of an exemplary document 110 which is transported in portrait orientation and which will be bound along its long edge is read.
FIG. 21(b) is a top plan view illustrating how a second side of the document 110 is read, according to the conventional image reading apparatus.

In contrast, in the present embodiment, a flow chart equivalent to the flow chart of FIG. 8 is executed only when the document G is to be fed in horizontal orientation, as illustrated in FIGS. 17 and 18.

FIGS. 17(*a*) and 17(*b*) illustrate the document G, which is a DOCUMENT BOUND ALONG SHORT EDGE, and which is to be fed in horizontal or landscape orientation. FIG. 17(*a*) further illustrates that the delay time T2 is "0" for reading the obverse face of the document G, while FIG. 17(*b*)

further illustrates that the delay time T2 is not "0" for reading the reverse face of the document G.

It is added that FIG. 17(a) illustrates the first side (i.e., the obverse side) of the document G on which an image of "ABC" is drawn along one of the long edges, while FIG. 17(b) illustrates the second side (i.e., the reverse side) of the document G on which an image of "abc" is drawn along one of the long edges.

For the document G of DOCUMENT BOUND ALONG SHORT EDGE, an image is pre-recorded on the first side of the document G, using as a reference for image disposition, one of the opposite short edges which the document G is to be bound for filing, while an image is pre-recorded on the second side of the document G, using as a reference for image disposition, one of the opposite short edges which the document G is not to be bound for filing.

For clarification, in FIGS. 17(a) and 17(b), the white arrows indicate the directions in which the opposite sides of the document G are read. Further, a top edge of the document G when viewed in a direction to allow an image formed on each side of the document G to erect is colored black to form a black-colored band.

More specifically, in the present embodiment, the CPU 81 implements a step equivalent to step S12 illustrated in FIG. 8 to determine whether or not a current document G is a DOCUMENT BOUND ALONG SHORT EDGE.

If so, then the CPU 81 implements steps equivalent to steps S13 and S14 illustrated in FIG. 8 to calculate a delay time T2 of the start-of-reading timing for reading the image on the reverse side of the document G.

As a result, when the document G is fed in horizontal orientation, and when the document G is a DOCUMENT BOUND ALONG SHORT EDGE, the start-of-reading timing for reading the image on the reverse side of the document G is delayed.

Where the start-of-reading timing is delayed, the image reading operation starts on the second side of the document G at a position spaced apart from the leading edge of the second side, by a distance corresponding to the delay time T2 (=A−B), as illustrated in FIG. 17.

If, however, the CPU 81 determined that the document G was a DOCUMENT BOUND ALONG LONG EDGE., then the CPU 81 proceeds to a step equivalent to step S15 illustrated in FIG. 8, by skipping a step equivalent to step S14 illustrated in FIG. 8. As a result, the image reading operation starts on the reverse face of the document G exactly at its leading edge.

THIRD EMBODIMENT

Next, a third embodiment of the present invention will be described.

Because the present embodiment is different from the first embodiment, only with respect to the software configuration, and is common to the first embodiment with respect to other elements, the common elements will be omitted in detailed description by reference using the identical reference numerals or names, while only the different elements will be described in greater detail below.

In the previous embodiments, a document orientation in which a current document G is to be fed with respect to its feed direction is limited to any one of a vertical orientation and a horizontal orientation.

In contrast, in the present embodiment, the multi-function device 1 is configured to allow the user to select a desired one of a vertical orientation and a horizontal orientation in feeding a current document G.

Therefore, the CPU 81 of the controller 80 is configured to determine whether the document orientation of the document G is a vertical orientation or a horizontal orientation.

For example, the CPU 81 implements a step equivalent to step S10 illustrated in FIG. 8, to detect the length of the document G in the secondary scan direction, and determine the document orientation of the document G based on the detected length.

More specifically, for the multi-function device 1, for example, a maximum width of a document that the supply tray 30 can accommodate is pre-set equal to the length of short edges of an A4-sized document.

In this example, if the detected length of the document G in the secondary scan direction is 297 mm, then a determination can be made that an A4-sized document is fed in vertical orientation. If the detected length is 257 mm, then a determination can be made that a B5-sized document is fed in vertical orientation. If the detected length is 148 mm, then a determination can be made that an A5-sized document is fed in horizontal orientation. If the detected length is 182 mm, then a determination can be made that a B5-sized document is fed in horizontal orientation.

It is added that, for the multi-function device 1, how to identify the document orientation during document transport is not limited to the above approach.

More specifically, the multi-function device, for identifying the document orientation, may employ a technique of optically detecting the document orientation of the document G by use of an optical sensor mounted facing the document loaded surface of the supply tray 30, a technique of analytically detecting the document orientation by effecting an analysis of image data produced by the image reading unit 24 indicative of the image on the document G, etc.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for processing images previously-formed on first and second opposite sides of a document, comprising:
    an image reader having a reading position and reading the images on the document at the reading position as the document and the reading position move relative to each other per each scan;
    document transport elements transporting the document such that the first side is moved facing the reading position, and, after the image reader reads the first side, transporting again the document such that the second side is moved facing the reading position; and
    a timing controller controlling at least one of a start-of-reading timing of the first side during a preceding reading-stage by the image reader and a start-of-reading timing of the second side during a subsequent reading-stage by the image reader, such that a relationship between the start-of-reading timing of the first side and the start-of-reading timing of the second side varies, depending on whether or not an extension direction of a binding edge along which the document is to be bound is parallel to a document orientation in which a length of the document is oriented with respect to a transport direction of the document being transported by the document transport elements.

2. The apparatus according to claim 1, wherein the timing controller determines the extension direction of the binding edge, based on information entered by a user for specifying the extension direction of the binding edge.

3. The apparatus according to claim 1, wherein the timing controller includes:
   (a) a first determining section determining the extension direction of the binding edge, based on first input information;
   (b) a second determining section determining whether or not the extension direction of the binding edge determined by the first determining section is parallel to the document orientation; and
   (c) a timing delay unit delaying one of the start-of-reading timing of the first side and the start-of-reading timing of the second side, with respect to the other, provided that the second determining section has determined that the extension direction of the binding edge is parallel to the document orientation.

4. The apparatus according to claim 3, wherein the document is defined by its opposite long edges and its opposite short edges perpendicular to the long edges, and
   wherein the first input information includes identification information used for identifying whether the document transported by the document transport elements is a document bound along one of the long edges, the document having a binding edge extending in a lengthwise direction of the document, or a document bound along one of the short edges, the document having a binding edge extending in a widthwise direction of the document, and
   wherein the first determining section determines whether the document transported by the document transport elements is a document bound along the long edge or a document bound along the short edge, based on the identification information.

5. The apparatus according to claim 1, wherein the document transport elements reverse the transport direction of the document with respect to its original transport direction, prior to the subsequent reading-stage, and
   wherein the timing controller delays the start-of-reading timing of the second side with respect to the start-of-reading timing of the first side, provided that the extension direction of the binding edge is parallel to the document orientation.

6. The apparatus according to claim 5, wherein the image transport elements include:
   a generally U-shaped main transport path along which the document is transported across the reading position; and
   a reversing path, communicatable with the main transport path, along which the document is transported for allowing the transport direction of the document to be reversed with respect to its original transport direction.

7. The apparatus according to claim 6, wherein the reversing path is disposed within or outside a space defined by the main transport path.

8. The apparatus according to claim 5, wherein the document transport elements transport the document such that the document moves across the image reader in the same direction both when the image reader read the first side and when the image reader reads the second side.

9. The apparatus according to claim 5, wherein the image transport elements, having a bi-directional path along which the document is transported for allowing the transport direction of the document to be reversed with respect to its original transport direction, transport the document using the bi-directional path for allowing the second side to be read by the image reader.

10. The apparatus according to claim 9, wherein the bi-directional path, having its length shorter than a length of a duplex-readable maximum-size document as viewed in portrait-orientation, allows a leading portion of the document, upon entry into the bi-directional path, to move past an end of the bi-directional path, resulting in external exposure.

11. The apparatus according to claim 9, wherein the document transport elements further include a generally U-shaped main transport path along which the document is transported, the main transport path having an upper portion disposed upstream and a lower portion disposed downstream in the transport direction of the document,
   wherein the bi-directional path is disposed so as to be communicatable with the upper portion of the main transport path, and
   wherein the document transport elements further include a by-pass path disposed so as to be communicatable with the lower portion of the main transport path and the bi-directional path, to thereby allow the document, upon the first side being read by the image reader, to enter the bi-directional path.

12. The apparatus according to claim 1, wherein the document transport elements reverse the transport direction of the document with respect to its original transport direction, prior to the subsequent reading-stage, and
   wherein the timing controller includes:
   (a) a first determining section determining the extension direction of the binding edge, based on first input information;
   (b) a second determining section determining whether or not the extension direction of the binding edge determined by the first determining section is parallel to the document orientation; and
   (c) a timing delaying unit delays the start-of-reading timing of the second side with respect to the start-of-reading timing of the first side, provided that the second determining section has determined that the extension direction of the binding edge is parallel to the document orientation.

13. The apparatus according to claim 12, wherein the timing delay unit determines an amount of delay of the start-of-reading timing of the second side with respect to the start-of-reading timing of the first side, based on related information related to a read range of the document within which the image reader reads during each scan, provided that the second determining section has determined that the extension direction of the binding edge is parallel to the document orientation.

14. The apparatus according to claim 13, wherein the related information includes setting information for defining the read range, and wherein the timing delay unit determines the amount of delay, based on a difference between a size of the read range defined by the setting information and a size of the document.

15. The apparatus according to claim 13, further comprising an image recording unit recording images on a record medium based on the images on the first and second sides read by the image reader, wherein the related information includes setting information for defining the read range, and wherein the timing delay unit determines the amount of delay, based on a difference between a size of the read range defined by the setting information and a size of the record medium.

16. The apparatus according to claim 15, wherein the timing delay unit delays the start-of-reading timing of the second side with respect to the start-of-reading timing of the first side, when the read range defined by the setting information is larger in size than the record medium.

17. The apparatus according to claim 1, further comprising a variable enlargement/reduction unit enlarging or reducing the images read by the image reader at a desired enlargement/reduction ratio, wherein the related information includes information representative of the desired enlargement/reduction ratio.

18. A method of processing images previously-formed on first and second opposite sides of a document, comprising the steps of:

reading the images on the document at a reading position as the document and the reading position move relative to each other per each scan;

transporting the document such that the first side is moved facing the reading position, and, after the first side is read, transporting again the document such that the second side is moved facing the reading position; and controlling at least one of a start-of-reading timing of the first side during a preceding reading-stage at the reading step and a start-of-reading timing of the second side during a subsequent reading-stage at the reading step, such that a relationship between the start-of-reading timing of the first side and the start-of-reading timing of the second side varies, depending on whether or not an extension direction of a binding edge along which the document is to be bound is parallel to a document orientation in which a length of the document is oriented with respect to a transport direction of the document being transported at the transporting step.

\* \* \* \* \*